United States Patent [19]

Kato et al.

[11] Patent Number: 5,590,632
[45] Date of Patent: Jan. 7, 1997

[54] APPARATUS FOR COMPUTING THE AMOUNT OF INTAKE AIR IN INTERNAL COMBUSTION ENGINE

[75] Inventors: Senji Kato, Aichi-ken; Kouji Endo, Mizunami; Shigeru Sone, Toyota; Atsushi Goto, Toyota; Nobuhisa Ohkawa, Toyota, all of Japan

[73] Assignee: Toyota Jidosha Kabushiki Kaisha, Aichi-ken, Japan

[21] Appl. No.: 391,180

[22] Filed: Feb. 21, 1995

[30] Foreign Application Priority Data

Mar. 10, 1994 [JP] Japan .................................. 6-040113
Dec. 28, 1994 [JP] Japan .................................. 6-328518

[51] Int. Cl.$^6$ ............................ F02D 13/02; F02D 41/34
[52] U.S. Cl. ....................... 123/480; 123/90.15; 73/117.3
[58] Field of Search .................................. 123/480, 486, 123/478, 90.15–90.18; 73/117.3, 116, 118.2; 364/431.04, 431.05

[56] References Cited

U.S. PATENT DOCUMENTS 4,941,448   7/1990   Nakaniwa et al. ................. 123/480
4,957,088   9/1990   Hosaka ................................ 123/480

FOREIGN PATENT DOCUMENTS 59-120707   7/1984   Japan .
3-3910      1/1991   Japan .

*Primary Examiner*—Andrew M. Dolinar
*Attorney, Agent, or Firm*—Oliff & Berridge

[57] ABSTRACT

Disclosed is a device for calculating an amount of an air introduced to a cylinder of an engine. An air-intake passage introduces the air to the cylinder. An air-exhaust passage exhausts gas from the cylinder. Both passages respectively have an intake valve and an exhaust valve. Both valves are respectively driven by an intake valve drive mechanism and an exhaust valve drive mechanism in accordance with a rotation of a crank shaft to alternatively and selectively open and close, and simultaneously open during a valve overlap period to open the passages to the cylinder. A variable valve timing mechanism controls an operational timing of the valve drive mechanisms with respect to the crank shaft in accordance with a running condition of the engine to vary a timing of the valve driven by the valve drive mechanisms. The calculating device comprises a first detecting device, which detects a rotational speed of the crank shaft. A second detecting device detects an intake pressure in the air-intake passage. A third detecting device detects the operational timing of the valve drive mechanisms. A calculating device calculates a displacement of the operational timing according to the detected rotational speed of the crank shaft and the detected operational timing. A first computing device computes the amount of the air introduced to the cylinder in response to the rotational speed of the crank shaft, the intake pressure, and the displacement of the operational timing.

24 Claims, 10 Drawing Sheets

APPARATUS FOR COMPUTING THE AMOUNT OF INTAKE AIR IN INTERNAL COMBUSTION ENGINE

BACKGROUND OF THE INVENTION

1. Field of the Invention

The present invention relates to an apparatus for computing the amount of intake air to be supplied to the cylinders of an internal combustion engine. More particularly, this invention relates to an apparatus which computes the amount of intake air in an internal combustion engine having a valve timing mechanism that can change the operational timing of at least one of an intake valve and an exhaust valve.

2. Description of the Related Art

There is an internal combustion engine having a valve timing mechanism which can change the operational timing of the intake valve or exhaust valve. A variable valve timing mechanism (hereinafter abbreviated as VVT) is used to obtain the flat output torque characteristics over the entire operation area of the internal combustion engine or to stabilize the number of the rotations of the engine (engine speed) at the idling time.

Japanese Unexamined Patent Publication No. hei 3-3910 discloses a fuel injection amount control apparatus for an engine which has this type of VVT. The VVT described in this publication is designed to switch the operational timing of at least one of the intake valve and exhaust valve between a first timing suitable for a low engine speed and a second timing suitable for a high engine speed.

In FIG. 15, a characteristic curve L1 indicates the output torque of an engine when the first timing is selected, and a characteristic curve L2 indicates the output torque of the engine when the second timing is selected. The operational timing of a valve is switched at the point where those output torques coincide with each other, as indicated by a point NE1 in FIG. 15.

To effect this switching, an injection amount map for the first timing indicated by a characteristic curve L3 and an injection amount map for the second timing indicated by a characteristic curve L4 are prepared previously. Those maps are prepared in consideration of the intake air amount and fuel injection amount that affect the output torque of the engine. More specifically, for each valve timing, the intake air amount corresponding to the engine speed NE and the pressure PM in the intake manifold are previously obtained through experiments and the injection amount according to the intake air amount necessary to obtain a predetermined air-fuel ratio of an air-fuel mixture (ratio of the weight of air to that of the fuel) is set.

The valve timing is switched at the point NE1 where the injection amounts on the two injection amount maps almost coincide with each other. This scheme intends to suppress the shock from a torque change at the time the intake valve timing or exhaust valve timing is switched.

In a conventional engine having a mechanism which can set the valve timing as desired with respect to the strokes of pistons, the charging efficiency, having a close relationship with the intake air amount, changes in accordance with the running conditions of the engine. The charging efficiency is the ratio of the actual weight of air supplied to each cylinder to the weight of air to be supplied to each cylinder under atmospheric pressure. This charging efficiency changes in various forms in accordance with the closing timing of the intake valve and the length of the period the intake valve and exhaust valve are opened, i.e., the so-called valve overlap period. This charging efficiency is also influenced by the so-called internal exhaust gas recirculation (hereinafter abbreviated as internal EGR) by which a part of the burnt gas in a combustion chamber is mixed with the air-fuel mixture and recirculates. The amount of the recirculated gas is influenced by the pressure at the downstream side of the exhaust valve in the exhaust passage (nearly equal to the atmospheric pressure) and the intake pressure.

In view of the above, it is difficult to perform highly accurate injection amount control over the entire operation area of the internal combustion engine by simply switching the injection amount maps for the individual timings without considering a change in the charging efficiency.

SUMMARY OF THE INVENTION

Accordingly, it is a primary object of the present invention to accurately obtain the charging efficiency and the intake air amount of an internal combustion engine, which change under the aforementioned various conditions to ensure highly accurate engine control.

To achieve the above objects, a calculating device for calculating an amount of air introduced to a cylinder of an engine is employed. An air-intake passage is arranged to introduce the air to the cylinder. An air-exhaust passage is arranged to exhaust gas from the cylinder. Both passages respectively have an intake valve and an exhaust valve therein. The valves are respectively driven by an intake valve drive mechanism and an exhaust valve drive mechanism in accordance with the rotation of a crank shaft to alternatively and selectively open and close, and to remain open during a valve overlap period. The engine includes a variable valve timing mechanism, which controls an operational timing of at least one of the valve drive mechanisms with respect to the crank shaft in accordance with a running condition of the engine to vary the timing of the valve driven by at least one of the valve drive mechanisms. The calculating device comprises first detecting means for detecting a rotational speed of the crank shaft. Second detecting means detects an intake pressure in the air-intake passage. Third detecting means detects the operational timing of at least one of the valve drive mechanisms. Calculating means calculates a displacement of the operational timing according to the detected rotational speed of the crank shaft and the detected operational timing. A first computing means computes the amount of the air introduced to the cylinder in response to the rotational speed of the crank shaft, the intake pressure, and the displacement of the operational timing.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention will now be described referring to FIGS. 1 through 11.

Figure 1:
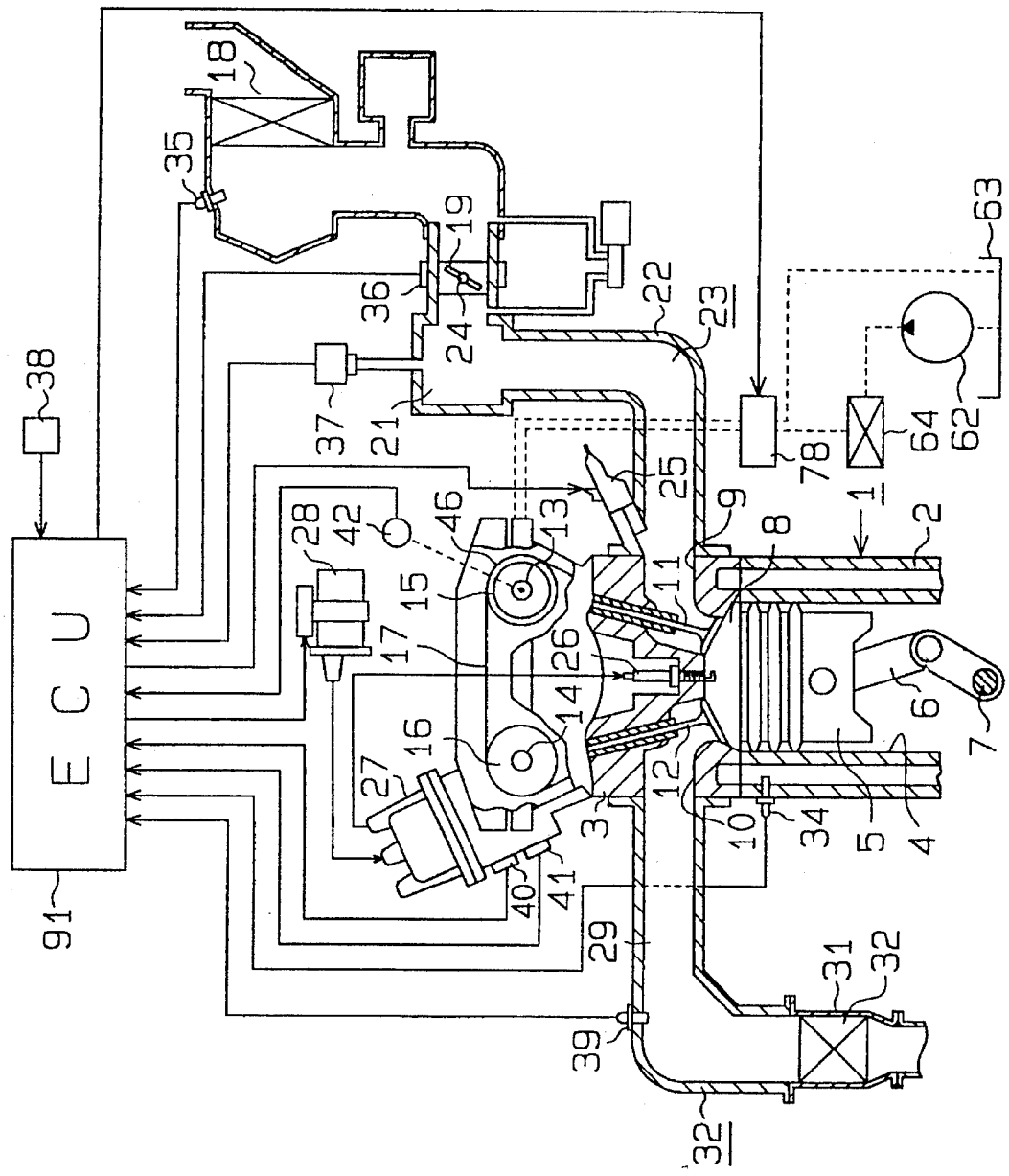
FIG. 1 is a schematic diagram of an apparatus for computing the intake air amount according to a first embodiment of the present invention.

As shown in FIG. 1, a 4-cycle, multiple cylinder, internal combustion gasoline engine (hereinafter simply called "engine") 1 is mounted in a vehicle. The engine 1 has a cylinder block 2 and a cylinder head 3. The cylinder block 2 has a plurality of vertically extending cylinders 4 (only one shown) arranged in the direction of the thickness of the drawing sheet, with a piston 5 reciprocally accommodated in each cylinder 4. Each piston 5 is coupled to a crankshaft 7 via a connecting rod 6. The reciprocation of each piston 5 is converted to rotational motion by the connecting rod 6 and is then transmitted to the crankshaft 7.

A combustion chamber 8 is formed above each piston 5 between the cylinder block 2 and the cylinder head 3. Intake ports 9 and exhaust ports 10, which communicate with the respective combustion chambers 8, are provided in the cylinder head 3. An intake valve 11 and an exhaust valve 12 are supported for reciprocating movement in nearly the vertical direction to open and close the respective ports 9 and 10. An intake cam shaft 13 is rotatably provided above the intake valve 11. The intake cam shaft 13 constitutes an intake valve driving mechanism to drive the intake valve 11. An exhaust cam shaft 14 is rotatably provided above the exhaust valve 12. The exhaust cam shaft 14 constitutes an exhaust valve driving mechanism to drive the exhaust valve 12. Timing pulleys 15 and 16 are respectively provided at the end portions of the cam shafts 13 and 14 are coupled to the crankshaft 7 via a timing belt 17.

As the crankshaft 7 rotates, its rotation is transmitted via the timing belt 17 to both timing pulleys 15 and 16. When the intake cam shaft 13 rotates in accordance with the rotation of the timing pulley 15, the intake valve 11 reciprocates to open and close the intake port 9. When the exhaust cam shaft 14 rotates in accordance with the rotation of the timing pulley 16, the exhaust valve 12 reciprocates to open and close the exhaust port 10.

Connected to the intake ports 9 are an air-intake passage 23 which is provided with an air cleaner 18, a throttle valve 19, a surge tank 21, and an intake manifold 22. The air outside the engine 1 is supplied to each combustion chamber 8 after passing the individual members 18, 19, 21 and 22 in the intake passage 23 in order.

The throttle valve 19 is rotatably supported in the intake passage 23 by a shaft 24. The shaft 24 is coupled via a wire or the like to an accelerator pedal (not shown) at the driver's seat, and is rotated together with the throttle valve 19 in response to the movement of the accelerator pedal by the driver. The amount of air flowing through the intake passage 23 or the intake air amount is determined by the rotational angle of the throttle valve 19. The surge tank 21 serves to dampen the pulsation of the intake air or the pressure vibration.

Injectors 25 are attached to the intake manifold 22 to inject fuel toward the respective intake ports 9. The air-fuel mixture including fuel to be injected from each injector 25 and the intake air is supplied into each combustion chamber 8. Ignition plugs 26 are attached to the cylinder head 3 to ignite this air-fuel mixture. The ignition plugs 26 are driven by ignition signals distributed by a distributor 27. The distributor 27 applies the high voltage output from each igniter 28 to the associated ignition plug 26 in synchronism with the rotational angle of the crankshaft 7 or the crank angle. The air-fuel mixture supplied into each combustion chamber 8 is burned by the associated ignition plug 26. The hot and high-pressure combustion gas produced at this time reciprocates the pistons 5 to rotate the crankshaft 7, thereby providing the driving power of the engine 1.

Connected to each exhaust port 10 is an air-exhaust passage 32 which is provided with an exhaust manifold 29, and a catalytic converter 31. The combustion gas produced in each combustion chamber 8 is discharged out of the engine 1 after passing the members 29 and 31 in the exhaust passage in order. The catalytic converter 31 incorporates a three way catalytic converter 33 to clean the combustion gas flowing through the exhaust passage 32.

In the engine 1 according to this embodiment, each piston 5 reciprocates twice and the crankshaft 7 makes two turns during the period in which the air-fuel mixture is supplied into the associated combustion chamber 8 and the combustion gas is discharged, i.e., during one cycle. It is known that this cycle consists of four strokes: the intake stroke, the compression stroke, the combustion and expansion stroke and the exhaust stroke. In the intake stroke, the piston 5 moves downward, generating a negative pressure inside the combustion chamber 8, and this negative pressure permits the fresh air-fuel mixture to enter the combustion chamber 8. In the compression stroke, the piston 5 moves upward to compress the air-fuel mixture. In the combustion and expansion strokes, the compressed air-fuel mixture is burned, generating the pressure that pushes the piston 5 downward. In the exhaust stroke, the piston 5 forced downward moves upward again to discharge the combustion gas out of the combustion chamber 8.

Various sensors are used to detect the running conditions of the engine 1. Provided at the cylinder block 2 is a coolant temperature sensor 34 which detects the temperature, THW, of the coolant in the engine 1. An intake-air temperature sensor 35 which detects the temperature of the intake air, THA, is provided in the vicinity of the air cleaner 18. A throttle sensor 36 which detects the rotational angle of the shaft 24 or the throttle angle TA is provided in the vicinity of the throttle valve 19. The surge tank 21 is provided with an intake-air pressure sensor 37 of a semiconductor type to detect the pressure in the intake passage 23. The intake-air pressure sensor 37 detects the pressure in the surge tank 21 with vacuum as a reference, i.e., a manifold pressure PM. An atmospheric pressure sensor 38 of a semiconductor type is provided in the passenger compartment in the vehicle to detect the atmospheric pressure PA. Provided in the exhaust passage 32 is an oxygen sensor 39 which detects the density of the oxygen remaining in the exhaust gas.

An engine speed sensor 40 is provided in the distributor 27. The engine speed sensor 40 has a rotor (not shown) which rotates in synchronism with the rotation of the crankshaft 7 and an electromagnetic pickup (not shown) provided in the vicinity of the rotor. The rotor is made of a disk-shaped magnetic member having a multiplicity of teeth around the periphery. The electromagnetic pickup outputs an engine speed pulse signal SG1 every time the rotor rotates in accordance with the rotation of the crankshaft 7 and the teeth of the rotor pass in front of the electromagnetic pickup.

A cylinder sensor 41 is provided in the distributor 27 to detect a plurality of signals output during one turn of the rotor to thereby discriminate each cylinder.

A VVT 46 is provided between the intake cam shaft and the timing pulley 15. The VVT 46 is designed to change the phase of the cam shaft 13 with respect to the rotation of the timing pulley 15 and eventually the rotation of the crankshaft 7, thereby continuously varying the operational timing of the intake valve 11 with respect to the crank angle. The VVT 46 is driven by hydraulic pressure.

The structure of the VVT 46 will now be described with reference to FIGS. 2 through 5.

The intake cam shaft 13 is rotatably supported between the cylinder head 3 and a bearing cap 48 by a journal 47 provided at the periphery of the intake cam shaft 13. The timing pulley 15 is attached on the outer surface of the intake cam shaft 13 in the frontward (leftward in FIGS. 2 and 4) vicinity of the journal 47 to be rotatable relative to the intake cam shaft 13. The timing pulley 15 and the timing belt 17 both have a plurality of teeth (only one side shown) which mate with one another.

A substantially cylindrical inner cap 51 is attached to the front end of the intake cam shaft 13 by a hollow bolt 52 and a pin 53 to be rotatable together with the cam shaft 13. A cover 55 having a plug 54 is attached to the timing pulley 15 by a plurality of bolts 56 and pins 57 to be rotatable together with the pulley 15. The cover 55 entirely covers the front end portion of the intake cam shaft 13 and the inner cap 51.

The timing pulley 15 and intake cam shaft 13 are coupled together by a ring gear 58, for timing adjustment, interposed between the cover 55 and the inner cap 51. The ring gear 58 is substantially ring-shaped and is accommodated in space S defined by the timing pulley 15, cover 55 and inner cap 51.

The ring gear 58 reciprocates between a first position and a second position. At the first position, the ring gear 58 abuts on the cover 55. At this time, the rotational phase of the cam shaft 13 with respect to the crankshaft 7 delays most and the operational timing of the intake valve 11 delays most with respect to the rotation of the crankshaft 7. The operational timing of the intake cam shaft 13 then is called a first operational timing.

At the second position, the ring gear 58 abuts on the timing pulley 15. At this time, the rotational phase of the cam shaft 13 with respect to the crankshaft 7 advances most and the operational timing of the intake valve 11 is the earliest. The operational timing of the intake cam shaft 13 then is called a second operational timing.

A multiplicity of teeth 58a and 58b are respectively provided on the inner and outer surfaces of the ring gear 58. A multiplicity of teeth 51a and 55b are respectively provided on the outer surface of the inner cap 51 and the inner surface of the cover 55 in association with the teeth 58a and 58b. Those teeth 58a, 58b, 51a and 55b are helical teeth which intersect the axis of the intake cam shaft 13. The teeth 51a mate with the teeth 58a, and the teeth 55b mate with the teeth 58b.

The engagement of those teeth allows the rotational movement of the timing pulley 15 to be transmitted to the intake cam shaft 13 via the cover 55, the ring gear 58 and the inner cap 51. Since the teeth 58a, 58b, 51a and 55b are helical teeth, when the ring gear 58 moves horizontally, the twisting force is applied to the inner cap 51 and the cover 55. Consequently, the intake cam shaft 13 rotates relative to the timing pulley 15.

In the space S, a first oil pressure chamber 59 is formed at the front side of the ring gear 58, and a second oil pressure chamber 61 is formed at the back of the ring gear 58. To supply lubricating oil to the individual oil chambers 59 and 61, an oil pump 62 is used as shown in FIG. 1. The oil pump 62 is drivably coupled to the crankshaft 7 and is activated according to the running of the engine 1 to pump the lubricating oil from an oil pan 63 and to discharge it to the oil pan 63. Foreign substances such as worn and powdered metal in the discharged lubricating oil are filtered off by an oil filter 64. The lubricating oil passing the oil filter 64 is supplied to the individual oil pressure chambers 59 and 61.

Figure 2:
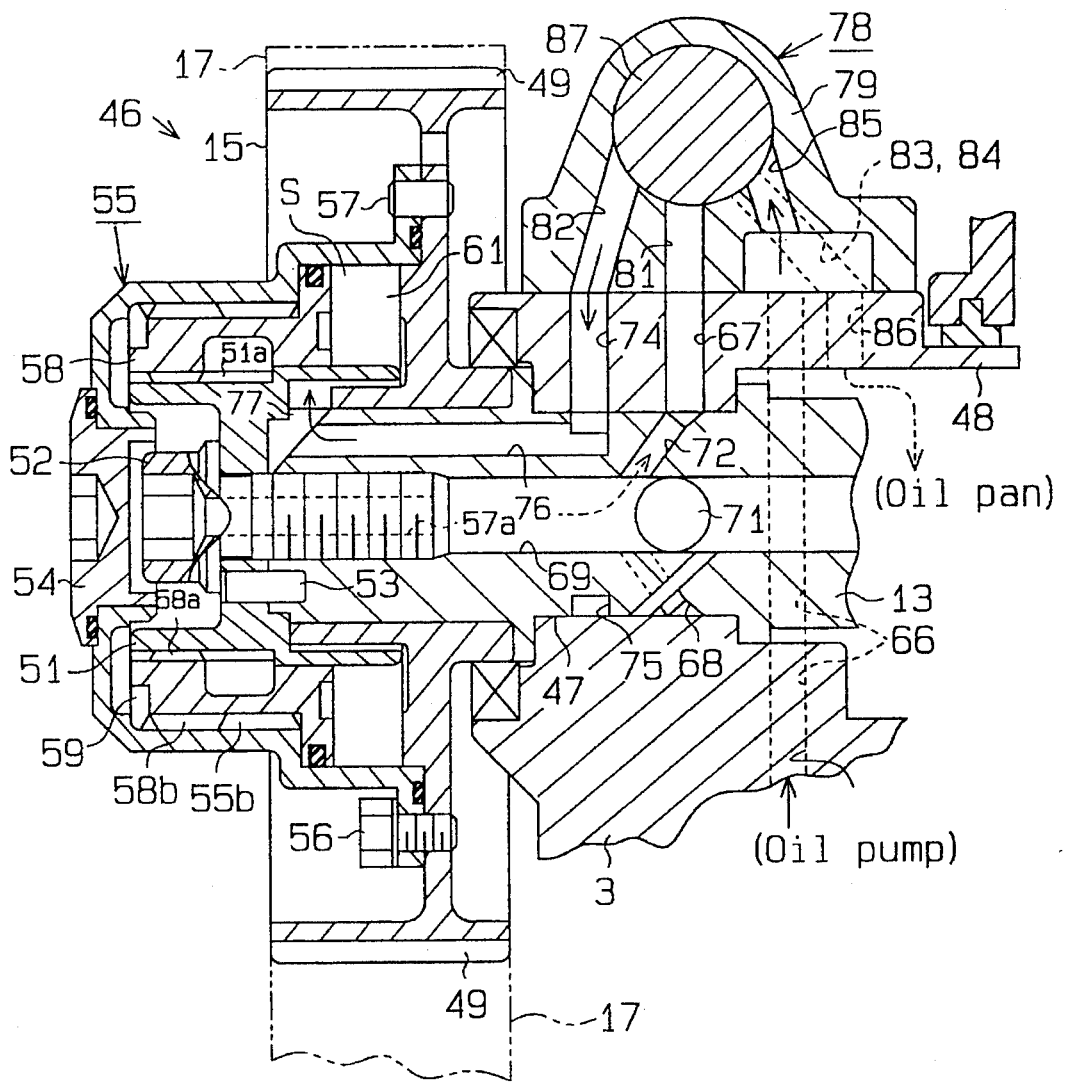
FIG. 2 is a cross-sectional view of a VVT when a ring gear is held at a first position.
Figure 4:
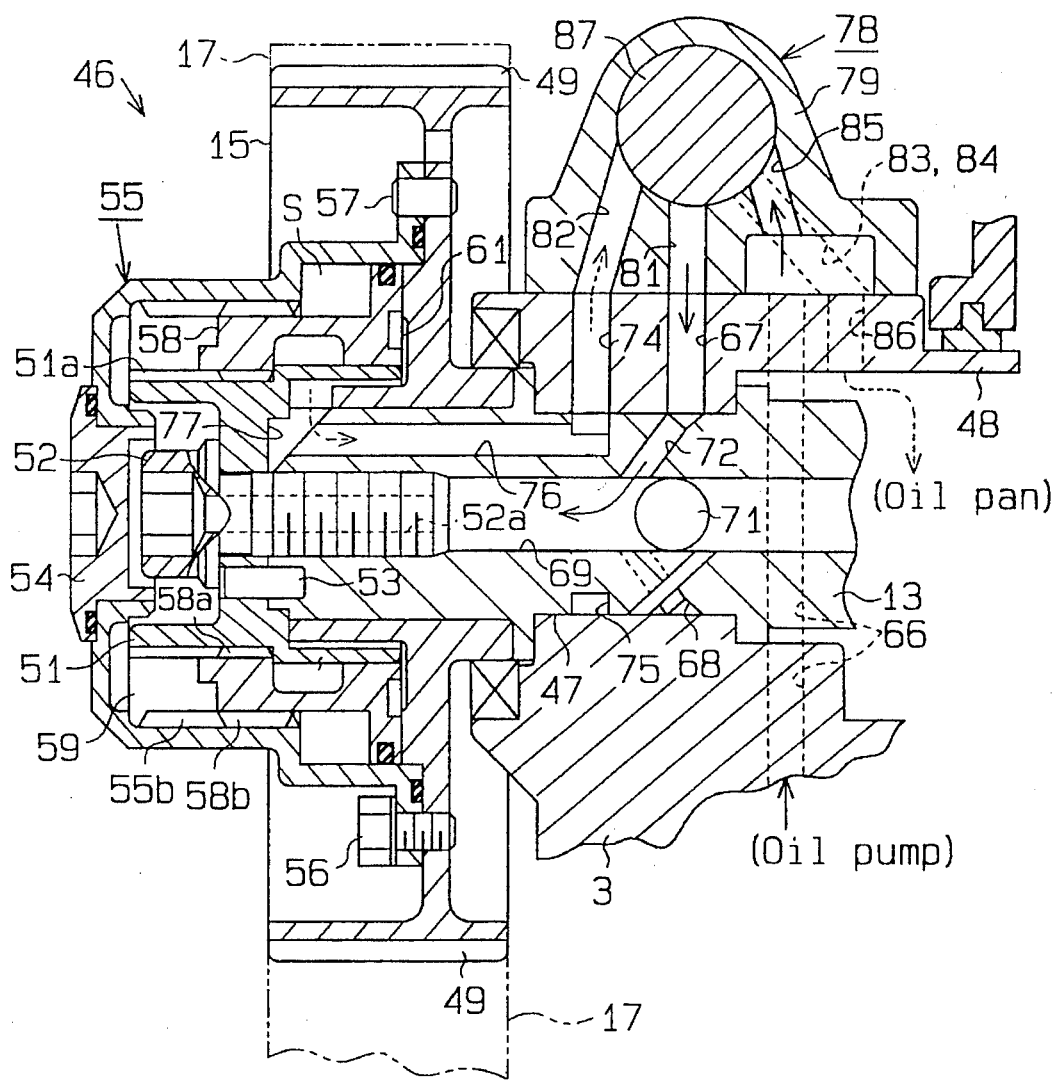
FIG. 4 is a cross-sectional view of the VVT when the ring gear is held at a second position.

As shown in FIGS. 2 and 4, the oil pump 62 communicates with the first oil chamber 59 via a first oil supply passage, which will now be discussed more specifically. A head oil passage 66 extending vertically is formed in the cylinder head 3 and the bearing cap 48. An oil hole 67 extending in parallel to the head oil passage 66 is formed in the bearing cap 48. A journal groove 68 which communicates with the oil hole 67 is formed in the entire surface of the journal 47 for the intake cam shaft 13.

A shaft oil passage 69 extending along the axis of the intake cam shaft 13 is formed in the cam shaft 13. The shaft oil passage 69 is separated into a front portion and a back portion by a ball 71 disposed midway in the shaft oil passage 69. A through hole 72, which causes the journal groove 68 to communicate with the shaft oil passage 69, is bored through the cam shaft 13. The front portion of the shaft oil passage 69 communicates with the first oil pressure chamber 59 via a center hole 52a of the hollow bolt 52. The head oil passage 66, through hole 67, journal groove 68, through hole 72, shaft oil passage 69 and center hole 52a constitute the first oil supply passage.

The oil pump 62 communicates with a second oil pressure chamber 61 via a second oil-supply passage. To describe the second oil-supply passage more specifically, a through hole 74 extending in parallel to the through hole 67 is formed in the bearing cap 48. A journal groove 75 which communicates with the through hole 74 is formed in the entire surface of the journal 47 of the intake cam shaft 13. A shaft oil passage 76 extending parallel to the shaft oil passage 69 is formed in the intake cam shaft 13. The rear half of the shaft oil passage 76 is connected to the journal groove 75, and the front half of the shaft oil passage 76 is connected to the second oil pressure chamber 61 via a through hole 77 provided between the intake cam shaft 13 and the inner cap 51. The aforementioned head oil passage 66, through hole 74, journal groove 75, shaft oil passage 76 and through hole 77 constitute the second oil supply passage.

An electromagnetic linear solenoid valve (hereinafter abbreviated as LSV) 78 is provided midway of the first and second oil supply passages to adjust the oil pressures given to the individual oil pressure chambers 59 and 61.

Figure 3:
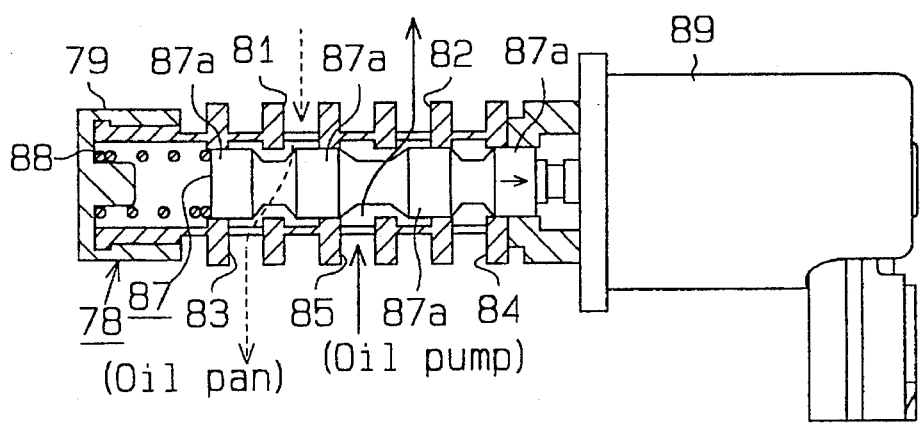
FIG. 3 is a cross-sectional view of a linear solenoid valve (hereinafter abbreviated as LSV) when a spool is held at the rear end of its movable range.

As shown in FIGS. 2 and 3, a casing 79 of the LSV 78 has a first port 81, a second port 82, a third port 83, a fourth port 84 and a fifth port 85, which permit the interior and exterior of the casing 79 to communicate with each other. The first port 81 is connected to the through hole 67, and the second port 82 is connected to the through hole 74. The third and fourth ports 83 and 84 are connected to the oil pan 63 via a through hole 86 formed in the bearing cap 48. The fifth port 85 is connected to the oil pump 62 via the head oil passage 66 and the oil filter 64.

A spool 87 having four cylindrical valve bodies 87a is reciprocatably retained in the casing 79. The spool 87 is moved in the axial direction by the action of a spring 88 and an electromagnetic solenoid 89, which are provided at each end of the spool 87 respectively.

Figure 5:
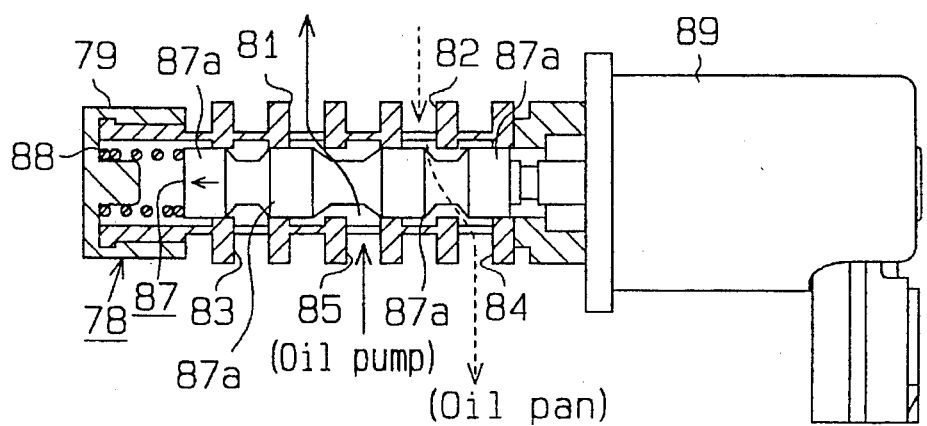
FIG. 5 is a cross-sectional view of the LSV when the spool is held at the forward end of its movable range.
Figure 6:
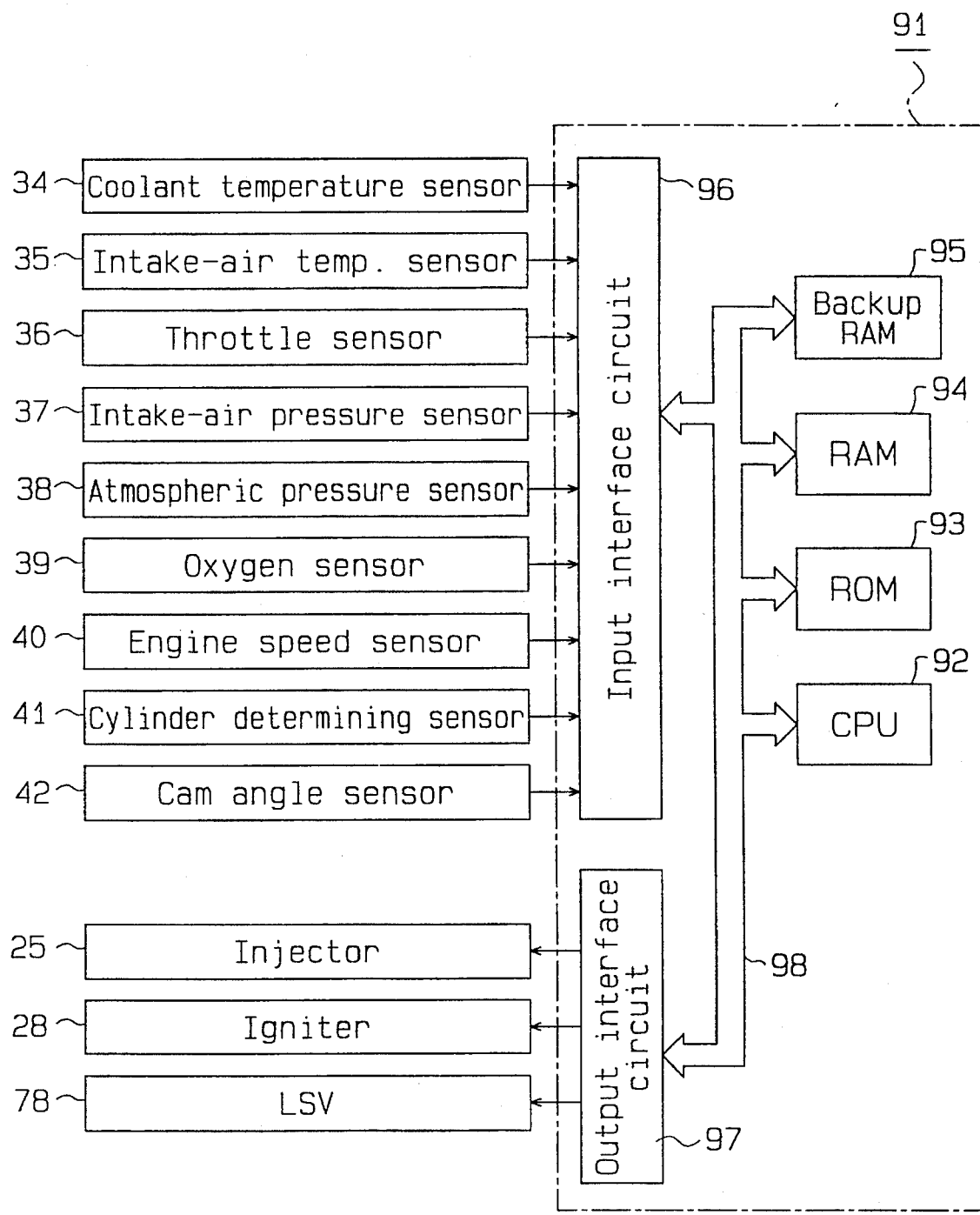
FIG. 6 is a block diagram showing the internal structure of an electronic control unit (hereinafter abbreviated as ECU)
Figure 7:
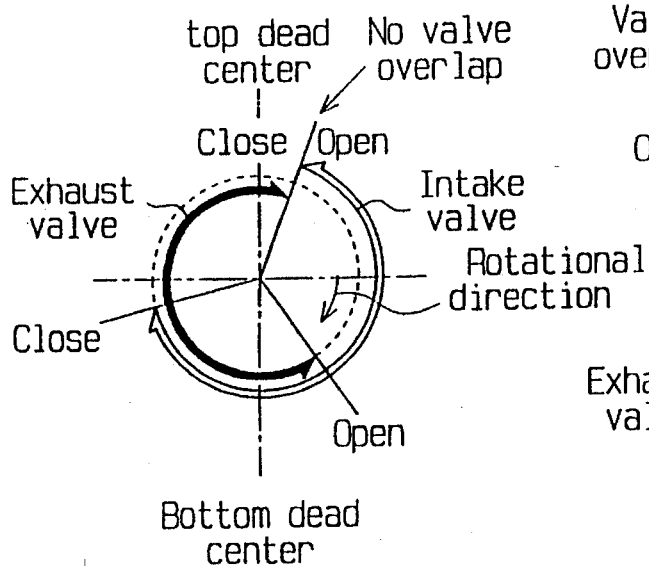
FIGS. 7A and 7B are diagrams showing the open period of an exhaust valve.
Figure 7:
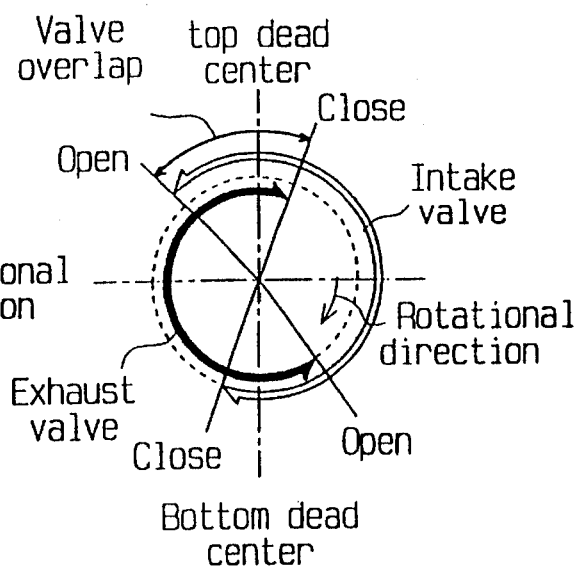

For example, when the spool 87 is moved forward (leftward in the diagram) as shown in FIG. 5, the fifth port 85 communicates with the first port 81 and the second port 82 communicates with the fourth port 84. The oil pressure given to the head oil passage 66 is supplied to the first oil pressure chamber 59 from the LSV 78 via the through hole 67, the journal groove 68, the through hole 72, the shaft oil passage 69 and the center hole 52a. When this oil pressure is applied to the ring gear 58 from its front side, the ring gear 58 rotates while moving rearward against the pressure of the lubricating oil in the second oil pressure chamber 61. At this time, the twisting force is applied to the inner cap 51 and the cover 55.

As a result, the rotational phase of the intake cam shaft 13 with respect to the timing pulley 15 changes, thus advancing the operational timing of the intake valve 11. With regard to the above operation, it is apparent with reference to the valve timing diagram of FIG. 7B that the entire open range of the intake valve 11 is shifted to advance the timing to open the valve 11, so that the valve overlap period during which this valve 11 and the exhaust valve 12 are both open is increased.

When the ring gear 58 abuts on the timing pulley 15 and stops at the second position in accordance with the rearward movement of the ring gear 58, the timing to open or close the intake valve 11 is advanced most.

When the spool 87 of the LSV 78 is moved backward (rightward in the diagram) as shown in FIG. 4, the fifth port 85 communicates with the second port 82 and the first port 81 communicates with the third port 83. The oil pressure given to the head oil passage 66 is supplied to the second oil pressure chamber 61 from the LSV 78 via the through hole 74, the journal groove 75, the shaft oil passage 76 and the through hole 77. When this oil pressure is applied to the ring gear 58 from its rear side, the ring gear 58 rotates while moving in the axial direction against the pressure of the lubricating oil in the first oil pressure chamber 59. Accordingly, the twisting force is applied to the inner cap 51 and the cover 55. As a result, the rotational phase of the intake cam shaft 13 with respect to the timing pulley 15 changes, thus delaying the operational timing of the intake valve 11.

As regards the above operation, it is apparent with reference to the valve timing diagram of FIG. 7A that the entire open range of the intake valve 11 is shifted to delay the opening of the valve 11, so that the valve overlap period is reduced. When the ring gear 58 abuts on the cover 55 and stops at the first position in accordance with the forward movement of the ring gear 58, the timing to open or close the intake valve 11 is delayed most.

Because of the above-described structure of the VVT 46, the operational timing of the intake valve 11 and eventually the valve overlap period can be continuously changed between the state shown in FIG. 7A and the state shown in FIG. 7B by activating the VVT 46.

As shown in FIG. 1, the cylinder head 3 has a cam angle sensor 42. This sensor 42 has a rotor (not shown) which is mounted on the intake cam shaft 13 to be rotatable together with the shaft 13, and an electromagnetic pickup (not shown) provided opposite and in the vicinity of the rotor. The rotor is made of a disk-shaped magnetic member having a multiplicity of teeth on the periphery. The electromagnetic pickup outputs a cam angle pulse signal SG2 every time the rotor rotates in accordance with the rotation of the crankshaft 7 and the teeth of the rotor pass in front of the electromagnetic pickup.

An ECU 91 is used to control the individual injectors 25, the individual igniters 28 and the LSV 78 based on outputs from the aforementioned various sensors 34 to 42. The ECU 91 comprises a CPU 92, a read only memory (ROM) 93, a random access memory (RAM) 94, a backup RAM 95, an input interface circuit 96 and an output interface circuit 97. Those circuits 92 to 97 are connected together by a bus 98.

Predetermined control programs and initial data are previously stored in the ROM 93. For example, the ROM 93 stores programs shown in FIGS. 8 and 12, which are used for computing the fuel injection time. The ROM 93 also stores data respective to maps shown in FIGS. 9 to 11. The maps will be described later.

In accordance with the control programs and initial data stored in the ROM 93, the CPU 92 executes various operations. The RAM 94 temporarily stores the results of the operations executed by the CPU 92. The backup RAM 95 is backed up by a battery (not shown) so that it can hold various kinds of data in the RAM 94 even after power supply to the ECU 91 is stopped.

Connected to the input interface circuit 96 are the aforementioned coolant temperature sensor 34, intake-air temperature sensor 35, throttle sensor 36, intake-air pressure sensor 37, atmospheric pressure sensor 38, oxygen sensor 39, engine speed sensor 40, cylinder sensor 41 and cam angle sensor 42. Connected to the output interface circuit 97 are the injectors 25, igniters 28 and LSV 78.

The CPU 92 receives the detection signals from the individual sensors 34 to 42 via the input interface circuit 96. Based on those inputs, the CPU 92 computes the engine speed NE, displacement angle θ and the like. Based on the computed values, the CPU 92 activates the injectors 25, igniters 28 and LSV 78 to execute the fuel injection amount control, ignition timing control and valve timing control.

For example, the CPU 92 computes the engine speed NE by measuring the time interval of the engine speed signal SG1 output from the engine speed sensor 40. The CPU 92 computes the rotational phase of the cam shaft 13 or the displacement angle θ based on the number of pulses of the engine speed signal SG1 which has been received until the CPU receives a predetermined reference engine speed signal SG1 after receiving the engine speed signal SG1 upon the generation of the cam angle signal SG2. The displacement angle θ is the angle of the intake cam shaft 13 which is displaced by the VVT 46 to adjust the operational timing of the intake valve 11.

Data about the optimal ignition timings according to the running conditions of the engine 1 is previously stored in the ROM 93 for the ignition timing control. Based on the detection signals from the individual sensors, the CPU 92 detects the running conditions of the engine 1, such as the engine speed, the manifold pressure and the idling state. Referring to the data in the ROM 93, the CPU 92 determines the optimal ignition timing and outputs a primary-current inhibition signal to the igniters 28 to control the ignition timing.

To control the valve timing, the CPU 92 reads the throttle angle TA, engine speed NE, displacement angle θ, etc. obtained by the sensors 36, 40, 42, etc. Using a control map previously prepared, the CPU 92 computes a target displacement angle θVTA based on the throttle angle TA, engine speed NE, etc. The CPU 92 performs feedback control on the opening amount of the LSV 78 in such a way that the displacement angle θ coincides with the target displacement angle θVTA. This control adjusts the oil pressure given to both pressure chambers 59 and 61 of the VVT 46. The operational timing of the intake valve 11 is continuously changed in accordance with the running conditions of the engine 1, thereby continuously adjusting the valve overlap period.

The adjustment of the valve overlap period enhances the charging efficiency in each combustion chamber 8. The charging efficiency is the ratio of the weight of the air actually supplied to the cylinder 4 to the weight of the air occupying the stroke displacement under the standard atmospheric condition (20° C., 760 mmHg and humidity of 65%). The stroke displacement is the volume of the space from the bottom dead center of the piston 5 to the top dead center. Increasing the charging efficiency can effectively increase the output of the engine 1 particularly in the high-load and high-speed region of the engine 1.

As mentioned earlier, the gas burned in the combustion chamber 8 is not entirely discharged out of the engine 1 but at least a part of the gas remains in the combustion chamber 8. When the intake valve 11 is open, the remaining gas returns to the intake passage 23 to be mixed with an air-fuel mixture to be combusted next so that the remaining gas is supplied again into the combustion chamber 8. The amount of the recirculated gas by such an internal EGR is adjustable by changing the valve overlap period. It is therefore desirable that the valve overlap period be properly changed according to the adjustment of the valve timing by the VVT 46.

When the amount of the recirculated gas increases and the amount of the gas included in the amount of the intake air increases, a large error occurs between the intake air amount and the amount of air to be supplied next. It is therefore important to consider the amount of the recirculated gas in computing the intake air amount.

The occurrence of the EGR has a close relation with the manifold pressure PM and the exhaust pressure $P_{EX}$ at the downstream of the exhaust valve 12 in the exhaust passage 32. The level of the exhaust pressure has a correlation with the level of the atmospheric pressure. When the engine speed NE is low and the valve overlap period is long, the exhaust pressure $P_{EX}$ nearly equals to the atmospheric pressure PA. Under these conditions, a part of the burned gas once discharged to the exhaust passage 32 from the combustion chamber 8 is blown back to the combustion chamber 8 and the intake passage 23 due to the difference between the exhaust pressure $P_{EX}$ (≈PA) and the manifold pressure PM. It is thus considered that the amount of the recirculated gas is greatly affected by the difference between the atmospheric pressure PA and the manifold pressure PM, or the boost pressure Pb. By using the atmospheric pressure PA as a parameter in addition to the engine speed NE, manifold pressure PM and displacement angle θ, therefore, the charging efficiency in the light of the amount of the recirculated gas can be computed.

The operations of the thus constituted embodiment will now be discussed.

Figure 8:
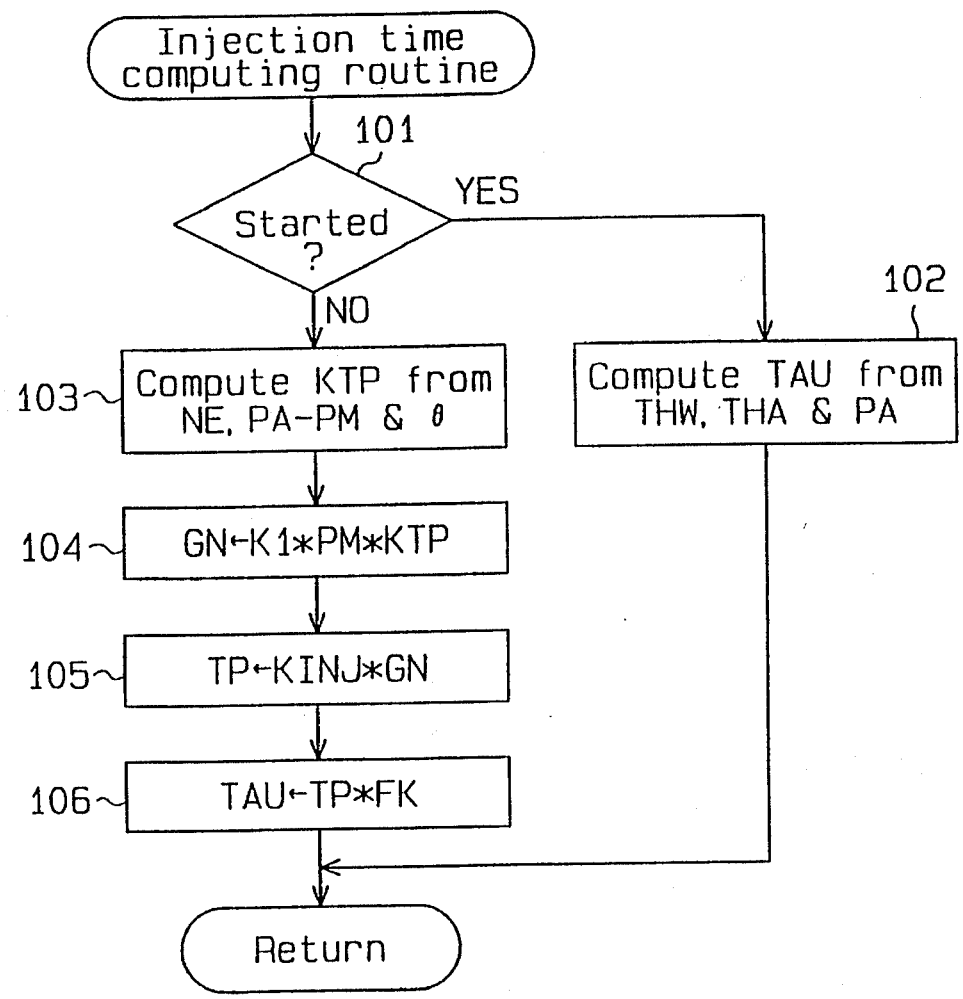
FIG. 8 is a flowchart illustrating a routine which is used by a central processing unit (CPU) to compute the injection time.

The flowchart shown in FIG. 8 illustrates one routine in the individual processes that are executed by the CPU 92. According to this routine, the amount of intake air supplied to the combustion chamber 8 through the intake passage 23 is obtained and the mass of the fuel to be combusted by the intake air or the fuel injection amount is obtained. The fuel injection amount is determined according to the injection time in which the fuel is injected while the needle valve (not shown) of the injector 25 is open, i.e., the energization time of the solenoid coil (not shown) to activate the needle valve. In the routine shown in FIG. 8, therefore, the injection time TAU is computed as a parameter concerning the injection amount.

The CPU 92 first determines if the engine 1 has just started in step 101. This determination condition is satisfied for example when the starter is activated and the engine speed NE is equal to or below a predetermined value (e.g., 400 rpm). When this determination condition is satisfactory, the CPU 92 determines that it is difficult to accurately detect the intake air amount because the engine 1 has just started, and proceeds to step 102. In step 102, the CPU 92 obtains the injection time TAU according to a predetermined map or equation based on the coolant temperature THW from the coolant temperature sensor 34, the intake-air temperature THA from the intake-air temperature sensor 35 and the atmospheric pressure PA from the atmospheric pressure sensor 38. After obtaining the injection time TAU, the CPU 92 temporarily terminates this routine.

If the determination condition in step 101 is not met, the CPU 92 determines that the engine 1 has started and is in an almost stable state, and reads the engine speed NE and the displacement angle θ in step 103. The CPU 92 also reads the atmospheric pressure PA detected by the atmospheric pressure sensor 38 and the manifold pressure PM detected by the intake-air sensor 37, and computes the difference between both pressures (PA−PM) to obtain the boost pressure Pb.

This boost pressure Pb is inversely proportional to the load of the engine 1. For instance, at the idling time or in the low-load state where the intake passage 23 is closed by the throttle valve 19, the manifold pressure PM is low and the boost pressure Pb becomes large. In the maximum-load state where the intake passage 23 is opened greatly by the throttle valve 19, the manifold pressure PM becomes high to approach the atmospheric pressure PA and the boost pressure Pb thus becomes smaller.

Figure 9:
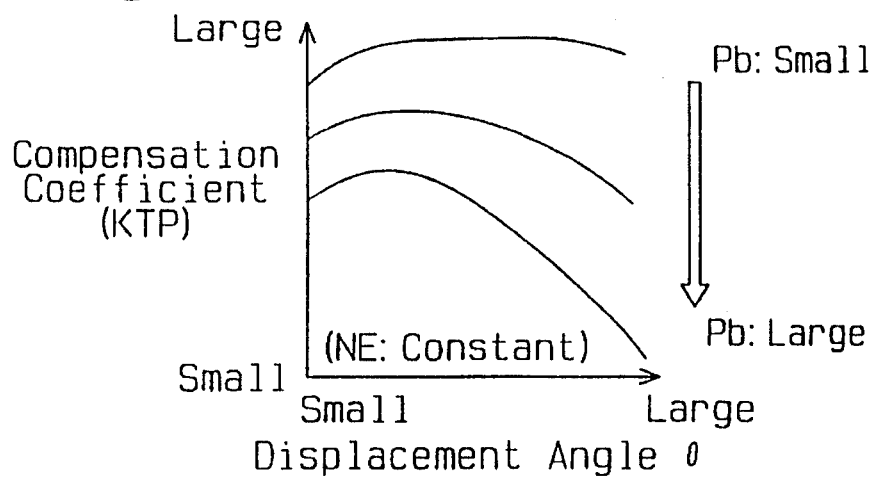
FIG. 9 is a characteristic chart showing the relation among a change angle, a compensation coefficient and a boost pressure.
Figure 10:
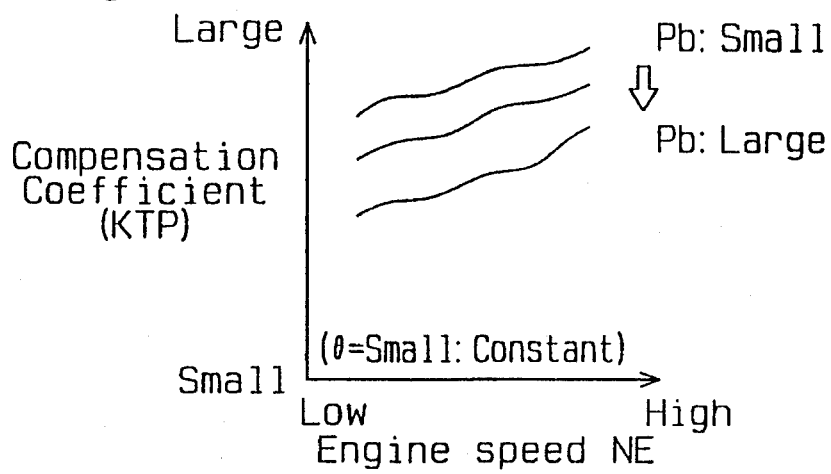
FIG. 10 is a characteristic chart showing the relation among a rotational speed, the compensation coefficient and the boost pressure.
Figure 11:
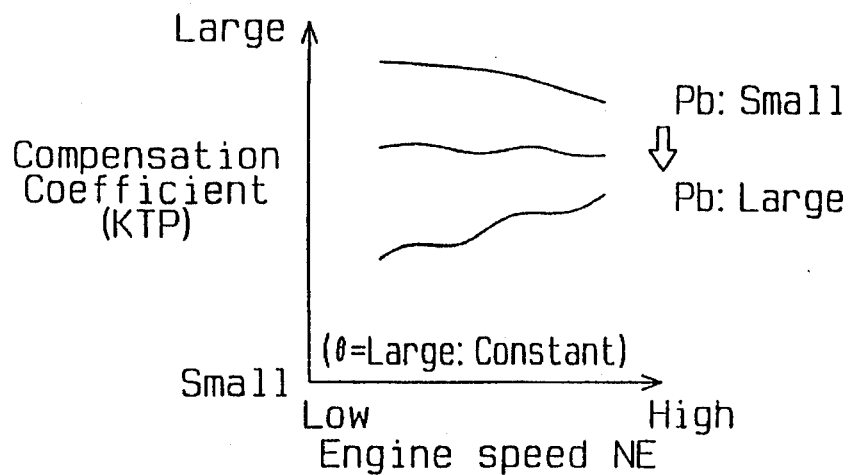
FIG. 11 is a characteristic chart showing the relation among the rotational speed, the compensation coefficient and the boost pressure.

Based on the engine speed NE, boost pressure Pb and displacement angle θ, the CPU 92 computes a compensation coefficient KTP. The compensation coefficient KTP is used in obtaining the intake air amount and is equivalent to the charging efficiency. To obtain the compensation coefficient KTP, three three-dimensional maps as shown in FIGS. 9 to 11 are used. In those maps, one compensation coefficient KTP is plotted for each of the combinations of three values: any two of the engine speed NE, load and displacement angle θ are taken as parameters and a given value is assigned to the remaining one. Thus, the compensation coefficients plotted in those diagrams indicate common values.

The tendency of the compensation coefficients KTP plotted in FIGS. 9 through 11 will be explained.

FIG. 9 shows the compensation coefficient KTP with respect to the load and displacement angle θ with the engine speed NE taken as constant. When the load is low or the boost pressure Pb is high, as the displacement angle θ and thus the valve overlap period become large, the amount of the recirculated gas increases. As a result, the ratio of the newly supplied air in the intake air amount drastically decreases. FIG. 9 shows a fall of the compensation coefficient KTP as the reflection of the drastic change. It is apparent that in the area where the displacement angle θ is small, the compensation coefficient KTP temporarily increases as the displacement angle θ increases. This is due to an increase in newly supplied air. This is also because that as the displacement angle θ or the valve overlap period increases, the close timing of the intake valve 11 approaches the timing at which the piston reaches the bottom dead center. An increase in charging efficiency is superior to a decrease in newly supplied air caused by the increase in the amount of the recirculated gas.

Referring to FIG. 9, when the load is high or the boost pressure Pb is low, the amount of the recirculated gas hardly changes even if the displacement angle θ changes. This is because return of the exhaust gas does not occur due to the fact that the manifold pressure is almost equal to the exhaust pressure if the value overlap period is large. The compensation coefficient KTP therefore varies due to the inertia of the intake air.

In general, when the load is high and the displacement angle θ is large in the low engine speed area, i.e., when the intake valve 11 is closed at a quicker timing, the compensation coefficient KTP becomes maximum. When the load is high and the displacement angle θ is large in the high engine speed area, the compensation coefficient KTP becomes minimum (see FIG. 11).

FIGS. 10 and 11 show the compensation coefficient KTP with respect to the load and engine speed NE with the displacement angle θ taken as constant. FIG. 10 shows the case where the displacement angle θ is set to a small value and FIG. 11 shows the case where the displacement angle θ is set larger than the value in FIG. 10.

When the displacement angle θ is set to a small constant value with the boost pressure Pb being high, the valve overlap period becomes longer as the engine speed NE becomes low, so that the amount of the recirculated gas increases. The compensation coefficient KTP is therefore apt to increase nearly in proportion to the engine speed NE as apparent from FIG. 10.

When the boost pressure Pb is high and the displacement angle θ is large (FIG. 11), the compensation coefficient KTP is apt to become smaller than the one in the case where the displacement angle θ is small (FIG. 10). This phenomenon is also apparent from FIG. 9.

When the boost pressure Pb is low, as mentioned earlier, the amount of the recirculated gas changes little regardless of the displacement angle θ. It should be noted again that the inertia of the intake air mainly affects the compensation coefficient KTP. When the displacement angle θ is small and the close timing of the intake valve 11 is delayed, therefore, the compensation coefficient KTP increases as the engine speed NE becomes higher. In the opposite case, as the engine speed NE becomes higher, the compensation coefficient KTP becomes smaller.

When the compensation coefficient KTP suitable for the current engine speed NE is determined from the maps in FIGS. 9 to 11, the CPU 92 proceeds to step 104 and computes the mass of air, GN, to be supplied to the cylinder 4 in one intake stroke according to the following equation (1).

$$GN = K_1 \cdot PM \cdot KTP \quad (1)$$

where $K_1$ is a coefficient for converting the manifold pressure PM to the air mass GN when newly supplied air of a predetermined density which has this manifold pressure PM is supplied by the stroke displacement. In other words, $K_1$ is a coefficient with respect to PM and GN when the compensation coefficient KTP is "1" and is expressed by the following equation (2).

$$K_1 = (1/760 \text{ mmHg}) \cdot (\text{stroke displacement per one turn of the engine}) \cdot (\text{specific weight of air}) \quad (2)$$

Next, the CPU 92 computes the basic injection time TP in step 105 according to the following equation (3).

$$TP = K_{INJ} \cdot GN \quad (3)$$

where $K_{INJ}$ is a coefficient used to convert the air mass GN to the basic injection time TP and is determined by the flow rate of the fuel to be injected from the injector 25, the pressure of the fuel to be supplied to the injector 25 from the fuel pump, or the like.

In the subsequent step 106, the CPU 92 computes the injection time TAU according to the following equation (4) and then temporarily terminates this routine.

$$TAU = TP \cdot FK \quad (4)$$

where FK is a coefficient which is computed based on various coefficients and is used to compensate the injection time. The various coefficients include those concerning the intake-air temperature, the idling and the start of the engine, the engine power and the feedback control on the air-fuel ratio. Those coefficients will now be described. The coefficient about the intake-air temperature serves to compensate for an error in the air-fuel ratio of an air-fuel mixture (the ratio of the weight of air to the weight of fuel). The error is caused by the difference in the density of intake air with various temperature. The coefficient is obtained based on the intake-air temperature THA.

The coefficient about the idling is used to increase the basic injection time TP to improve the drivability when the engine is cold, and it is obtained based on the coolant temperature THW. The coefficient about the start of the engine serves to stabilize the engine speed NE immediately after the engine starts, and is obtained based on the coolant temperature THW.

The coefficient about the engine power serves to increase the basic injection time TP when the engine 1 runs under the condition where the engine 1 or the catalytic converter 31 is easily overheated. This compensation improves the drivability when the load of the engine 1 is high and suppresses the rise in the catalyst temperature. The coefficient about the engine power is obtained based on the manifold pressure PM, engine speed NE and throttle angle TA.

The coefficient about the feedback control on the air-fuel ratio serves to compensate the basic injection time TP in such a manner that the air-fuel ratio of the air-fuel mixture matches with the theoretical air-fuel ratio. The theoretical air-fuel ratio is the air-fuel ratio of the air-fuel mixture which contains the oxygen just enough to fully oxidize the fuel. For this compensation, the CPU 92 determines based on the signal from the oxygen sensor 39 whether the current air-fuel ratio is richer or leaner than the theoretical air-fuel ratio. The CPU 92 shortens the basic injection time TP when the current air-fuel ratio is richer than the theoretical one, and increases the basic injection time TP when the former air-fuel ratio is leaner than the latter one.

The CPU 92 computes the charging efficiency or the compensation coefficient KTP in the above manner (step 103). The CPU 92 computes the intake air amount or the air mass GN based on the compensation coefficient KTP and the manifold pressure PM (step 104).

Subsequently, the CPU 92 computes the injection time TAU according to the equation (4) and sends a drive signal according to the value TAU to the injectors 25 via the output interface circuit 97 in a routine prepared separately. In accordance with this signal, the injectors 25 are controlled to inject the fuel.

In the computation of the compensation coefficient KTP, the displacement angle θ of the intake cam shaft 13 is used in addition to the engine speed NE and manifold pressure PM as described above. Since this displacement angle θ is the parameter which directly concerns the driving of the VVT 46, the charging efficiency can be obtained accurately even if the charging efficiency varies due to a change in the close timing of the intake valve 11 or a change in valve overlap period.

Unlike the prior art which just selectively uses the injection amount maps for low-speed and high-speed timings without using the displacement angle θ, a variation in the intake air amount originating from a change in charging efficiency is compensated for so that the intake air amount according to the charging efficiency at an arbitrary operational timing of the intake valve 11 can be computed.

To compute the compensation coefficient KTP, the atmospheric pressure PA is used in addition to the engine speed NE, manifold pressure PM and displacement angle θ. This atmospheric pressure PA is associated with the exhaust pressure $P_{EX}$ and is involved together with the manifold pressure PM in the generation of the EGR. As the atmospheric pressure PA is used in the computation, therefore, the intake air amount in consideration of the EGR can be computed.

In particular, the difference between the atmospheric pressure PA and the manifold pressure PM or the boost pressure Pb as well as the engine speed NE and the displacement angle θ are used as parameters in the first embodiment. In the area where the engine speed NE is low and the valve overlap period is large, the intake air amount according to the amount of the recirculated gas can be computed accurately. If the intake air amount is obtained only from the manifold pressure PM in the intake passage 23, on the other hand, this intake air amount varies in accordance with the level of the atmospheric pressure. According to the first embodiment, the influence of this atmospheric pressure PA and thus the influence of the EGR are eliminated and the actual amount of the newly supplied air can be obtained. The following will discuss the theoretical grounds of the above.

Given that the volume flow rate associated with the EGR occurring in one stroke is $Q_2$, the following equation (5) is satisfied.

$$Q_2 = C_2 A_2 \Delta t \{\sqrt{(P_{EX} - PM)}\} \quad (5)$$
$$\approx C_2 A_2 \Delta t \{\sqrt{(PA - PM)}\}$$

where $C_2$ is the equivalent flow rate coefficient of the gas passage, $A_2$ is the area of the opening of the gas passage, $\Delta t$ is the valve overlap time, PM is the manifold pressure, and $P_{EX}$ is the pressure at the downstream of the exhaust valve 12 in the exhaust passage 32 or the exhaust pressure, and is nearly equal to the atmospheric pressure PA.

Given that the volume flow rate (including the recirculated gas) of the air supplied in one stroke is $Q_1$, $Q_1$ is approximately equal to the stroke displacement Vs ($Q_1 \approx Vs$).

For the sake of simplicity in the description, the temperature is taken as constant. Further, the volume flow rates $Q_1$ and $Q_2$ are converted to mass flow rates $G_1$ and $G_2$ through the following equations (6) and (7).

$$G_1 = Q_1\{(PM)/RT\} \quad (6)$$
$$= Vs\{(PM)/RT\}$$

$$G_2 = Q_2\{(PM)/RT\} \quad (7)$$
$$= C_2 A_2 \Delta t \sqrt{(PA - PM)} \{(PM)/RT\}$$

where R is a gas constant and T is the temperature of air in the intake passage.

Given that the amount of the newly supplied intake air per stroke is G, the following equation (8) is satisfied.

$$G = G_1 - G_2 \quad (8)$$
$$= G_1\{(G_1 - G_2)/G_1\}$$
$$= G_1\{1 - (G_2/G_1)\}$$
$$= G_1[1 - \{C_2 A_2 \Delta t \sqrt{(PA - PM)}\}/Vs]$$
$$= PM\{(Vs)/Rt\}[1 - \{C_2 A_2 \Delta t \sqrt{(PA - PM)}\}/Vs]$$

where $\{(Vs)/Rt\}$ is equivalent to the coefficient $K_1$ in the equation (1), and $[1-\{C_2 A_2 \Delta t \sqrt{(PA-PM)}\}/Vs]$ is equivalent to the compensation coefficient KTP in the equation (1).

When the air mass GN per one turn of the engine or the intake air amount G is expressed by the equations (1) and (8), GN or G becomes a function of PM and (PA–PM). Further, (PA–PM) is the only parameter in KTP, which concerns the load. By using the maps shown in FIGS. 9 to 11 which are prepared in light of the boost pressure Pb, therefore, the intake air amount and the basic injection time TP as a consequence can be computed without being affected by the atmospheric pressure PA or the EGR. The precision in the computation of the injection time TAU and the drive control on the injectors 25 by the CPU 92 are improved as compared with the case where the intake air amount or the injection time TAU is obtained simply from the manifold pressure PM.

A second embodiment will now be described with reference to FIG. 12. The second embodiment differs from the first embodiment in the contents of the routine for computing the injection time by the CPU 92, particularly, the process for obtaining the charging efficiency or the compensation coefficient KTP. The difference will be discussed below.

The ratio of the manifold pressure PM to the atmospheric pressure PM, (PM/PA), is used in computing the compensation coefficient KTP for the following reason. For instance, in the area where the engine speed NE is high or the area where the valve overlap is small, the EGR of the combustion gas does not occur according to the difference (PA–PM) between the atmospheric pressure PA and the manifold pressure PM. The combustion gas in the combustion chamber 8 is returned to the intake passage 23 the instant the intake valve 11 is open mainly in the exhaust stroke, and is supplied again there in the intake stroke, causing the EGR. The pressure of the combustion gas in the combustion chamber 8 when the intake valve 11 is open is almost equal to the atmospheric pressure. The pressure of the combustion gas acts as the manifold pressure PM when it is supplied again into the combustion chamber 8. It is therefore considered that the amount of the recirculated gas is greatly influenced by a change in this pressure.

Let V denote the volume in the cylinder 4 when the intake valve 11 is open. Further, the pressure of the combustion gas can be switched to the manifold pressure PM from the atmospheric pressure PA in the intake stroke. Then, the volume flow rate $Q_2$ of the EGR occurring in one stroke can be expressed by an equation (9) below instead of the equation (5).

$$Q_2 = V \cdot (PA/PM) \tag{9}$$

Substituting the equation (9) into the equations (7) and (8) yields the following equations (7a) and (8a).

$$G_2 = \{V(PA/PM)\}\{(PM/RT)\} \tag{7a}$$
$$= V(PA/RT)$$

$$G = PM\{(Vs)/RT\}[1 - (V/Vs)(PA/PM)] \tag{8a}$$

$[1-(V/Vs)(PA/PM)]$ in the equation (8a) is equivalent to the compensation coefficient KTP. The compensation coefficient KTP is therefore a function of the ratio (PA/PM), not the pressure difference (PA–PM).

In view of the above, the compensation coefficient KTP is obtained using the ratio (PM/PA) in the second embodiment. The reason why (PM/PA), the reciprocal of (PA/PM), is used is that the reciprocal represents the load factor, which can be defined as "1.0" when the throttle valve is wide open or the manifold pressure PM is equal to the atmospheric pressure PA, thus ensuring easier understanding of the meaning of the value.

Since the constitution of the engine 1 and the peripheral units, other than those associated with the injection time computing routine, is the same as that of the first embodiment, its description will be omitted.

Figure 12:
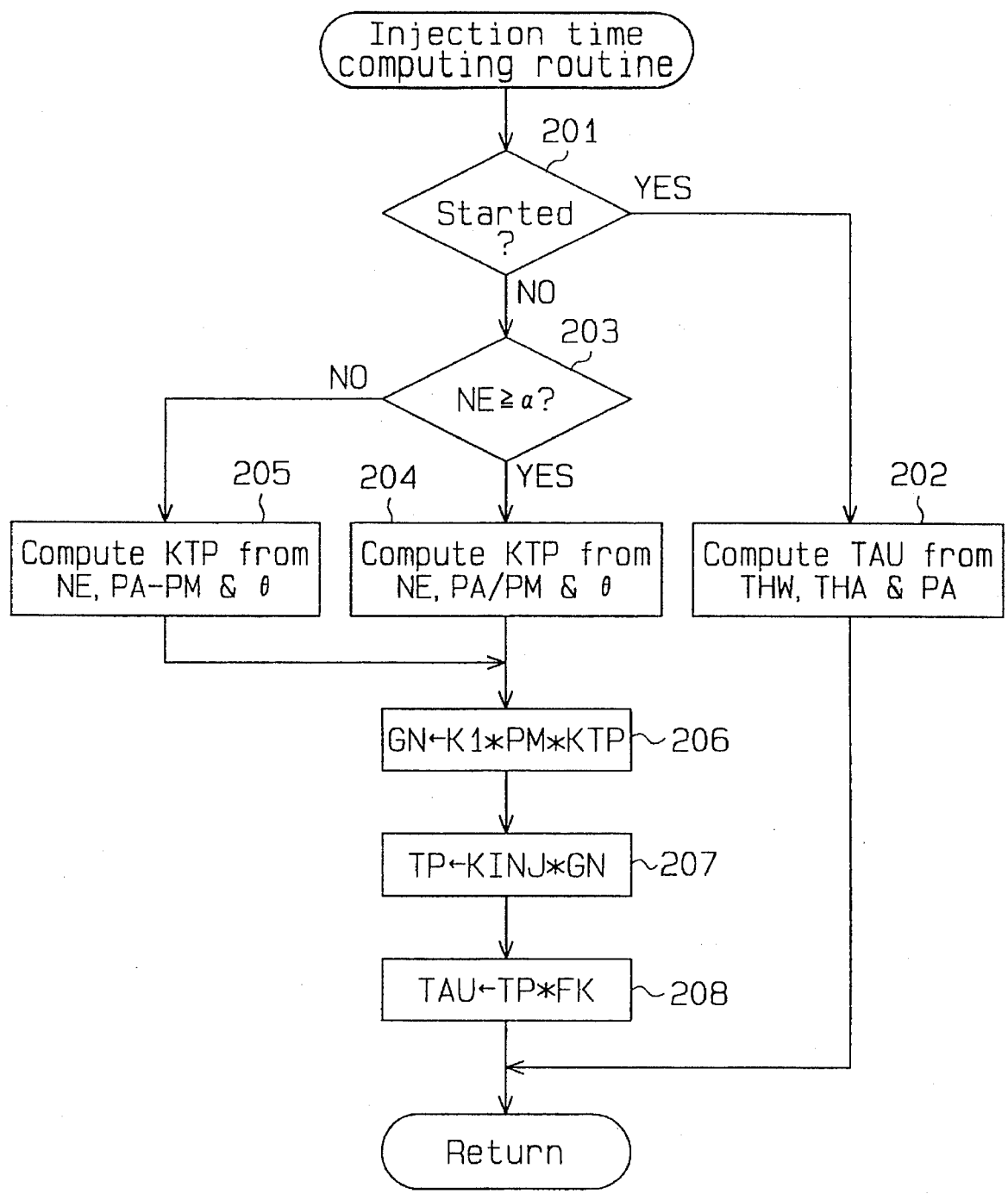
FIG. 12 is a flowchart illustrating a routine which is used to compute the injection time according to a second embodiment.

When the injection time computing routine in FIG. 12 starts, the CPU 92 first determines in step 201 if the engine 1 has just started as in step 101 in FIG. 8. When this determination condition is satisfactory, the CPU 92 determines that it is difficult to accurately detect the intake air amount and proceeds to step 202. In this step 202, the CPU 92 obtains the injection time TAU according to a predetermined map or equation based on the coolant temperature THW, the intake-air temperature THA and the atmospheric pressure PA, as in step 102 in FIG. 8. Then, the CPU 92 temporarily terminates this routine.

If the determination condition in step 201 is not met, the CPU 92 determines that the engine 1 has started, and determines in step 203 if the engine speed NE is equal to or greater than a previously set determination value α. The area where NE≧α corresponds to the second area where the combustion gas, returned to the intake passage 23 from the combustion chamber 8 in the valve overlap period while changing its pressure, is mixed with the air-fuel mixture to be combusted next.

The area where NE<α corresponds to the first area where the combustion gas, temporarily discharged to the exhaust passage 32 in the valve overlap period, is returned to the intake passage 23 due to the difference between the exhaust pressure $P_{EX}$ and the manifold pressure PM. This gas is mixed with the air-fuel mixture to be combusted next.

When the determination condition in step 203 is unsatisfactory and NE<α, in step 205, the CPU 92 reads the engine speed NE and the displacement angle θ and obtains the difference between the atmospheric pressure PA and the manifold pressure PM, or the boost pressure Pb as in step 103 in FIG. 8. The CPU 92 obtains the compensation coefficient KTP corresponding to the values NE, Pb and θ using the three-dimensional maps in FIGS. 9 to 11.

When the determination condition in step 203 is satisfactory and NE≧α, the CPU 92 reads the engine speed NE and the displacement angle θ and obtains the ratio of the atmospheric pressure PA to the manifold pressure PM. The CPU 92 obtains the compensation coefficient KTP corresponding to the values NE, PM/PA and θ using unillustrated maps.

After obtaining the compensation coefficient KTP in the step 204 or the step 205, the CPU 92 executes the sequence of processes similar to those in steps 104 to 106 in FIG. 8. That is, the CPU 92 computes the mass GN of the air to be filled in the cylinder 4 in one intake stroke in step 206 according to the equation (1). Next, the CPU 92 computes the basic injection time TP in step 207 according to the aforementioned equation (3), computes the injection time TAU in step 208 according to the aforementioned equation (4), and then temporarily terminates this routine.

The CPU 92 computes the charging efficiency or the compensation coefficient KTP (steps 204 and 205) in the above manner. The CPU 92 also computes the intake air amount or the air mass GN based on the compensation coefficient KTP and the manifold pressure PM (step 206).

After computing the injection time TAU, the CPU 92 sends a drive signal according to the value TAU to the injectors 25 via the output interface circuit 97 in a routine prepared separately. In accordance with this signal, the injectors 25 are controlled to inject a predetermined amount of fuel.

In the computation of the compensation coefficient KTP, the ratio (PM/PA) is used as a parameter in addition to the engine speed NE and the displacement angle θ as described above. Even if the pressure of the combustion gas changes to the manifold pressure PM from the atmospheric pressure PA when the intake valve 11 is open, changing the amount of the internal EGR, the charging efficiency can be obtained accurately. According to the second embodiment, therefore, a variation in the intake air amount originating from a change in charging efficiency is compensated for so that the intake air amount according to the charging efficiency at an arbitrary operational timing of the intake valve 11 can be computed as in the first embodiment.

According to the second embodiment, the way of computing the compensation coefficient KTP is changed in accordance with the running conditions of the engine 1. The processing executed by the CPU 92 includes the steps 205 and 204. In step 205, when the engine speed NE is less than the determination value α, the compensation coefficient KTP is computed based on the pressure difference (PA–PM). In step 204, when the engine speed NE is equal to or above the determination value α, the compensation coefficient KTP is computed based on the ratio (PM/PA). In the second embodiment, therefore, the intake air amount according to the amount of gas associated with the EGR can be computed accurately over the entire engine speed range.

A third embodiment will now be described with reference to FIGS. 13 and 14. In the third embodiment, when the value ($\theta a$) for the case where the operational timing of the intake valve 11 delays most is set as the target displacement angle $\theta$VTA according to the running conditions of the engine 1, a deviation or a difference between the value $\theta a$ and the actual displacement angle $\theta$ is obtained. The target displacement angle $\theta$VTA is obtained based on the throttle angle TA, the engine speed NE, etc. while referring to a previously specified map.

Further, the obtained difference is treated as a learning value GVT. The displacement angle $\theta$ is compensated using the learning value GVT, and the position of the ring gear 58 of the VVT 46 is adjusted so that the compensated displacement angle $\theta$VT coincides with the target displacement angle $\theta$VTA. The charging efficiency and the air mass GN are obtained using the compensated displacement angle $\theta$VT. Using this air mass GN, the ignition timing is computed. In the above points, the third embodiment differs significantly from the first and second embodiments. As the other structures are the same as those of the first embodiment, their descriptions will be omitted.

Figure 13:
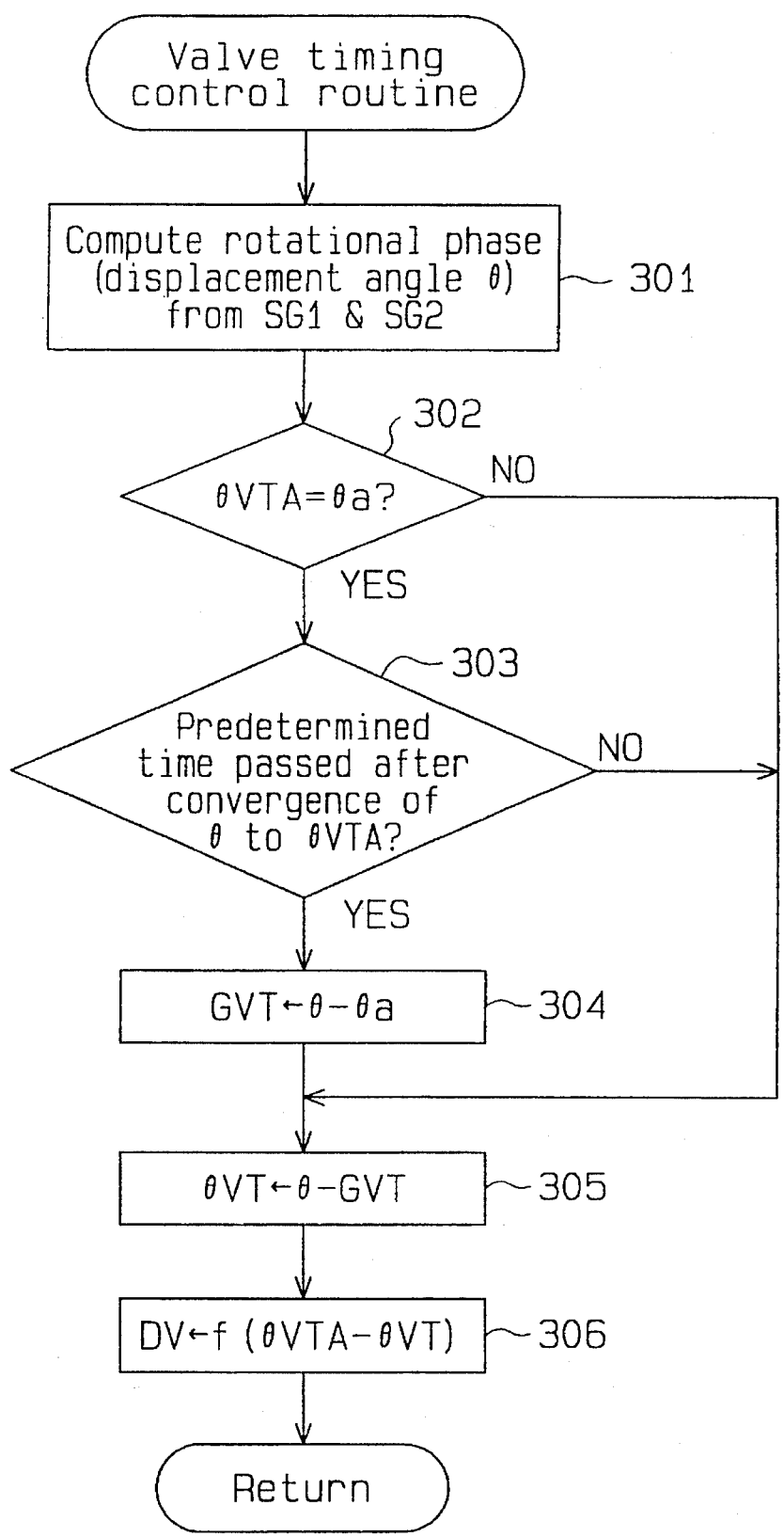
FIG. 13 is a flowchart illustrating a routine for controlling the valve timing according to a third embodiment.
Figure 14:
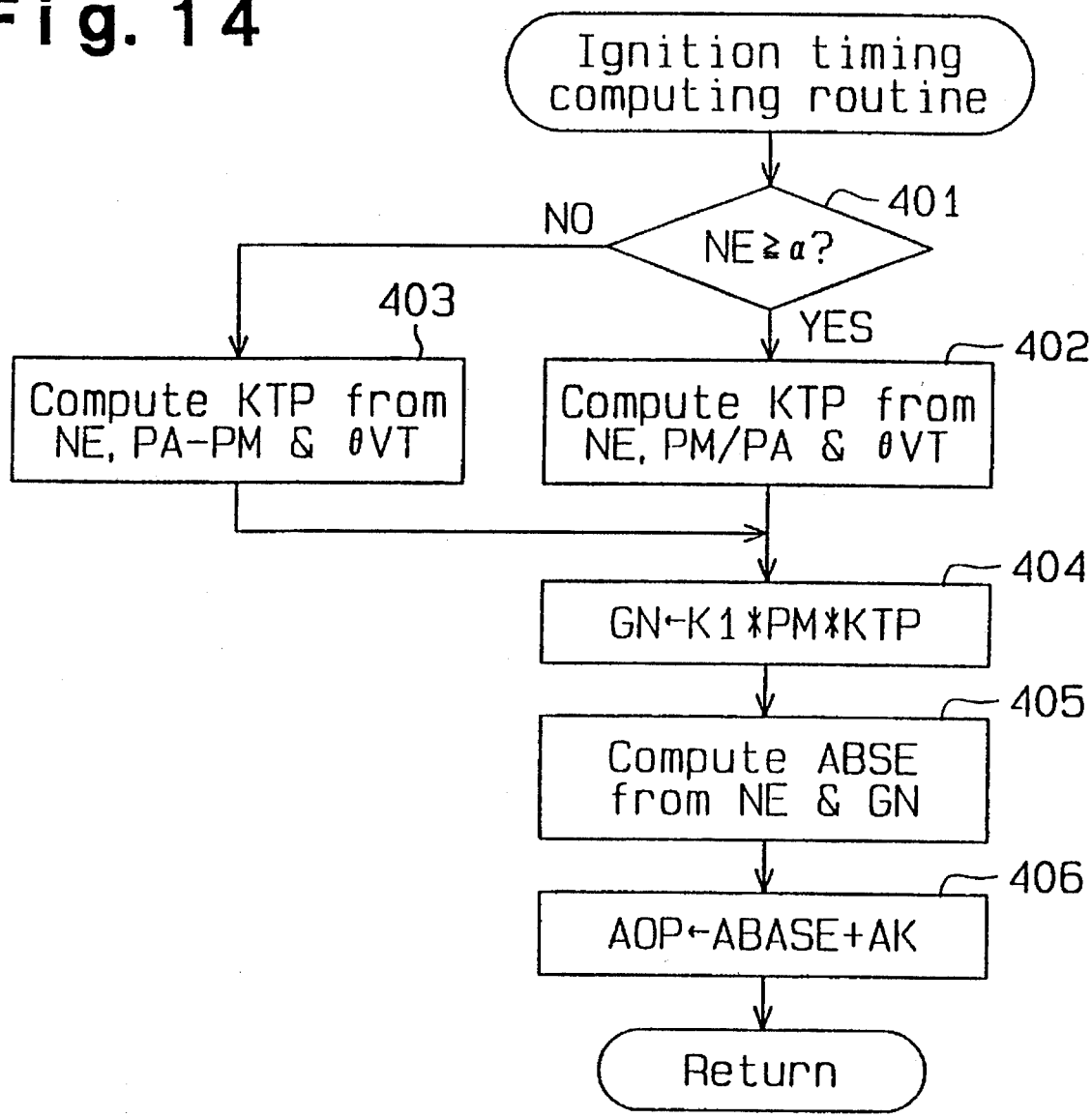
FIG. 14 is a flowchart illustrating a routine for computing the ignition timing.
Figure 15A:
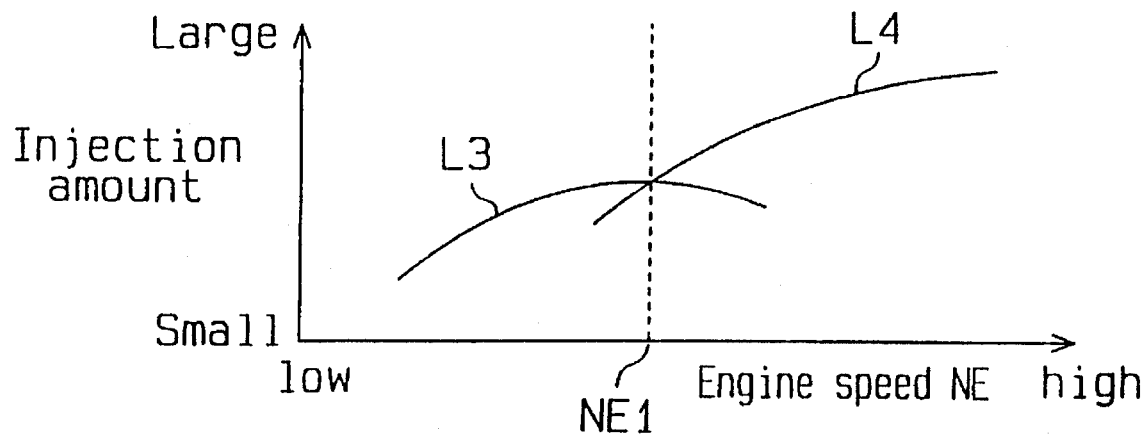
FIG. 15 is a conventional characteristic chart showing the relation among a rotational speed, injection amount and output torque.
Figure 15B:
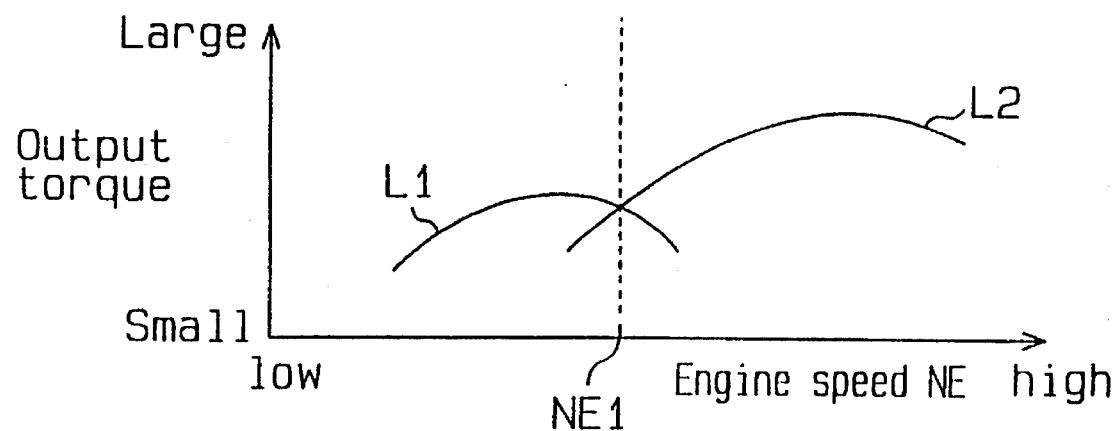

The flowchart in FIG. 13 illustrates a valve timing control routine in the process that is executed by the CPU 92. In this routine, the aforementioned, compensated displacement angle $\theta$VT is computed. This displacement angle $\theta$VT is used to adjust the operational timing of the intake valve 11. The flowchart in FIG. 14 illustrates an ignition timing computing routine for computing the ignition timing using the compensated displacement angle $\theta$VT that has been computed in the valve timing control routine.

The valve timing control routine in FIG. 13 will be discussed.

In step 301, the CPU 92 measures the time interval between the time at which the engine speed signal SG1 is output from the engine speed sensor 40 when the cam angle signal SG2 is output from the cam angle sensor 42, and the time at which a predetermined reference engine speed signal is output, and computes the actual displacement angle $\theta$ of the cam shaft 13 with respect to the crankshaft 7 based on the measured time.

In the next step 302, the CPU 92 determines if the target displacement angle $\theta$VTA is set to the predetermined value $\theta a$ (e.g., zero). At this time, if there is no sensor mounting error or no change with the passage of time in sensor position and the actual displacement angle $\theta$ coincides with this target value $\theta a$ in this routine, the ring gear 58 should be held at the first position or at the position where the ring gear 58 abuts on the cover 55. If there is any sensor mounting error or any change with the passage of time in sensor position, on the other hand, even when the ring gear 58 is moved to the first position, its further movement is restricted by the cover 55. This may cause the case where the actual displacement angle $\theta$ does not coincide with the target displacement angle $\theta a$.

When the target displacement angle $\theta$VTA is not set to the predetermined value $\theta a$ (zero) in the step 302 or when, even if such setting has been made, a predetermined time has not passed in step 303 since the convergence of the actual displacement angle $\theta$ to the target displacement angle $\theta$VTA, the CPU 92 proceeds to step 305 without executing step 304.

In step 305, the CPU 92 compensates the displacement angle $\theta$ to a value $\theta$VT according to a predetermined learning value $GVT_0$ (not shown), which is initially set. Then, in step 306, the CPU 92 operates the VVT 46 in response to the compensated displacement angle $\theta$VT and the target displacement angle $\theta$VTA.

When the determination condition in the aforementioned step 302 is satisfied, the CPU 92 goes to step 303 where it determines if the actual displacement angle $\theta$ is converted to the target displacement angle $\theta$VTA ($=\theta a$) and the difference between both displacement angles is kept constant over a predetermined period. When this condition is met, the CPU 92 determines that the displacement angle $\theta$ is approximately constant, sets the learning mode and obtains the difference between the actual displacement angle $\theta$ and the target displacement angle $\theta a$ in step 304. As already explained, this difference corresponds to a variation in the rotational phase which originates from the sensor mounting error or the change with the passage of time in the sensor position.

After setting the difference as the learning value GVT, the CPU 92 stores it in the RAM 94 and proceeds to step 305. If the target displacement angle $\theta a$ is zero, the actual displacement angle $\theta$ becomes the learning value GVT. This learning value GVT is updated every time the target displacement angle $\theta$VTA becomes the predetermined value $\theta a$ (zero).

In step 305, the CPU 92 subtracts the learning value GVT from the displacement angle $\theta$ to compensate the displacement angle $\theta$. Accordingly, the compensated displacement angle $\theta$VT obtained in step 305 becomes a highly precise value from which a variation in the rotational phase due to a sensor mounting error or the like is removed.

The CPU 92 adjusts the position of the ring gear 58 of the VVT 46 in step 306 in such a way that the compensated displacement angle $\theta$VT coincides with the target displacement angle $\theta$VTA. More specifically, the CPU 92 obtains the difference between the target displacement angle $\theta$VTA and the compensated displacement angle $\theta$VT and computes a target control amount DV according to the difference to control the LSV 78, while referring to a previously specified map or using a predetermined equation. The CPU 92 performs feedback control on the opening amount of the LSV 78 based on this target control amount DV. As a result, the oil pressures supplied to both oil pressure chambers 59 and 61 of the VVT 46 are adjusted and the ring gear 58 is moved accordingly. Then, the operational timing of the intake valve 11 is continuously changed in accordance with the running conditions of the engine 1, thereby continuously adjusting the valve overlap. After executing the step 306, the CPU 92 temporarily terminates this routine.

According to this valve timing control routine, even if there is a variation or a change with the passage of time in the mounting positions of the various sensors, such as the cam angle sensor 42, and the target displacement angle $\theta$VTA differs from the actual displacement angle $\theta$, this difference can be compensated using the learning value GVT and the accurate displacement angle $\theta$VT can be obtained. As this compensated displacement angle $\theta$VT is used in the feedback control on the opening amount of the LSV 78, the precision in the control of the target displacement angle $\theta$VTA is improved, e.g., the time required for the displacement angle $\theta$ to converge to the target displacement angle $\theta$VTA is shortened. For example, in the case where the displacement angle should be changed considerably in accordance with a drastic change in the running conditions of the engine, the time required for the angle $\theta$ to converge to the target angle $\theta$VTA is shortened.

In the valve timing control routine, the difference (learning value GVT) is obtained when a predetermined time passes after the convergence of the displacement angle $\theta$ to the target displacement angle $\theta a$. It is therefore possible to accurately obtain the compensated displacement angle $\theta$VT using the displacement angle $\theta$ which has reached nearly a constant level.

The ignition timing computing routine in FIG. 14 will now be described.

In steps 401 to 404, the CPU 92 executes the same sequence of processes in steps 203 to 206 in FIG. 12. The CPU 92 determines in step 401 if the engine speed NE is equal to or greater than a previously set determination value α.

When the determination condition in step 401 is not met and NE<α, the CPU 92 reads the engine speed NE and the compensated displacement angle θVT and obtains the difference (boost pressure Pb) between the atmospheric pressure PA and the manifold pressure PM in step 403. The displacement angle θVT this time is the value obtained in step 305 in the above-described valve timing control routine. The CPU 92 obtains the compensation coefficient KTP corresponding to the values NE, Pb and θVT using the maps in FIGS. 9 to 11. In computing this compensation coefficient KTP, the displacement angle θ in the maps is replaced with the compensated displacement angle θVT.

When the determination condition in step 401 is satisfactory and NE≧α, the CPU 92 reads the engine speed NE and the compensated displacement angle θVT and obtains the ratio of the atmospheric pressure PA to the manifold pressure PM in step 402. The CPU 92 obtains the compensation coefficient KTP corresponding to the values NE, PM/PA and θVT using unillustrated maps.

After obtaining the compensation coefficient KTP in the step 402 or the step 403, the CPU 92 computes the mass GN of the air to be filled in the cylinder 4 in one intake stroke in step 404 according to the equation (1).

In the next step 405, the CPU 92 selects a basic ignition advance angle ABSE from data stored in the ROM 93 based on the engine speed NE and the air mass GN. Subsequently, the CPU 92 adds a compensation value AK to the basic ignition advance angle ABSE and sets the result of the addition as an ignition timing AOP in step 406. The compensation value AK may be a compensation value for advancing the ignition timing to improve the performance at the idling time where the coolant temperature THW is low. The compensation value AK may also be a compensation value for advancing the ignition timing in accordance with the difference between the engine speed NE and its target value when the engine speed NE becomes lower than the target value after idling. After computing the ignition timing AOP, the CPU 92 temporarily terminates this routine.

In the ignition timing computing routine, the CPU 92 computes the charging efficiency or the compensation coefficient KTP (steps 402 and 403). Further, the CPU 92 computes the intake air amount (air mass GN) based on the compensation coefficient KTP and the manifold pressure PM (step 404). According to the third embodiment, therefore, a variation in the intake air amount originating from a change in charging efficiency is compensated for so that the intake air amount according to the charging efficiency at an arbitrary operational timing of the intake valve 11 can be computed as in the second embodiment.

In the ignition timing computing routine, the highly accurate displacement angle θVT after compensation, which has been obtained in the valve timing control routine, is used to compute the charging efficiency (compensation coefficient KTP). More accurate charging efficiency and intake air amount can be obtained as compared with the case where the displacement angle θ before compensation is used so that the proper ignition timing can be computed.

After computing the ignition timing AOP, the CPU 92 sends the primary-current inhibition signal to the igniters 28 to control the ignition timing in accordance with a separately prepared routine.

The present invention may be embodied in the following manners.

(1) In the first embodiment, the atmospheric pressure PA and the manifold pressure PM are detected by separate sensors and the boost pressure Pb is obtained based on the detection values from both sensors. Instead, the pressure (PA−PM) in the intake passage 23 with the atmospheric pressure PA as a reference may be detected by a single sensor and may be used as the boost pressure Pb.

(2) The atmospheric pressure PA may be obtained indirectly. More specifically, the output of the intake-air pressure sensor 37 with the throttle positioned close to the wide open state may be considered as the atmospheric pressure.

(3) In place of the maps in FIGS. 9 to 11, to obtain the compensation coefficient KTP, maps for directly obtaining the air mass GN per one turn of the engine and the basic injection time TP may be prepared.

(4) The present invention may be adapted for an engine which has a valve driving unit other than the cam shafts 13 and 14, such as an electromagnetic valve.

(5) The VVT may be provided at the exhaust valve driving mechanism so that the operational timing of the exhaust valve 12 is changed by the VVT to adjust the valve overlap. VVTs may be respectively provided at both the intake and exhaust valve driving mechanisms, so that the operational timings of the intake valve 11 and the exhaust valve 12 are respectively altered by those VVTs to adjust the valve overlap.

(6) The processes in step 203 and 205 in FIG. 12 may be omitted. Likewise, the processes in step 401 and 403 in FIG. 14 may be omitted. In other words, after the engine has started, the compensation coefficient KTP may be obtained using the ratio (PM/PA), regardless of the level of the engine speed NE.

(7) The intake air amount may be obtained directly from the engine speed NE, the manifold pressure PM and valve timing using maps, without computing the charging efficiency.

(8) In the third embodiment, the displacement angle, in the case where the operational timing of the intake valve 11 delays most, may be set as the target displacement angle, and the difference between this value and the actual displacement angle θ may be obtained to be the learning value GVT.

Therefore, the present examples and embodiments are to be considered as illustrative and not restrictive and the invention is not to be limited to the details given herein, but may be modified within the scope of the appended claims.

What is claimed is:

1. A device for determining an amount of an air introduced to a cylinder of an engine, said cylinder communicating with an air-intake passage and an air-exhaust passage, said air-intake passage being arranged to introduce the air to the cylinder, said air-exhaust passage being arranged to exhaust gas from the cylinder, both passages respectively having an intake valve and an exhaust valve therein, both valves being respectively driven by an intake valve drive mechanism and an exhaust valve drive mechanism in accordance with a rotation of a crank shaft to alternatively and selectively open and close, and to remain open during a valve overlap period to open the passages to the cylinder, said engine including a variable valve timing mechanism, and wherein said variable valve timing mechanism controls an operational timing of at least one of the valve drive mechanisms with respect to the crank shaft in accordance with a running condition of the engine to vary a timing of the valve driven by at least one of the valve drive mechanisms, said device comprising:

first detecting means for sensing crank shaft rotation and detecting a rotational speed of the crank shaft;

second detecting means for detecting an intake pressure in the air-intake passage;

third detecting means for detecting the operational timing of at least one of the valve drive mechanisms;

calculating means for calculating a displacement of the operational timing according to the detected rotational speed of the crank shaft and the detected operational timing; and first computing means for computing an amount of the air introduced to the cylinder in response to the rotational speed of the crank shaft, the intake pressure, and the displacement of the operational timing.

2. A device according to claim 1, wherein said first computing means computes a charging efficiency of the air to be charged in the cylinder in response to the rotational speed of the crank shaft, the intake pressure, and the displacement of the operational timing when computing the amount of the air, wherein said charging efficiency is represented by a ratio of a weight of the air actually introduced to the cylinder to the weight of the air to be introduced to the cylinder under a standard air condition.

3. A device according to claim 2, further comprising:

memory means for storing data relative to the charging efficiency predetermined according to the rotational speed of the crank shaft, the displacement of the operational timing, and a load to the engine, and wherein said first computing means reads the data from the memory means when computing the charging efficiency.

4. A device according to claim 2, further comprising:

fourth detecting means for detecting an atmospheric pressure, and wherein said first computing means computes the charging efficiency during the valve overlap period in response to the rotational speed of the crank shaft, the intake pressure, the displacement of the operational timing, and the atmospheric pressure.

5. A device according to claim 4, wherein said first computing means includes first determining means for determining in response to the rotational speed of the crank shaft whether the gas accompanies with a pressure change when the gas returns from the air-exhaust passage to the air-intake passage during the valve overlap period.

6. A device according to claim 5, wherein said first computing means computes the charging efficiency during the valve overlap period according to a difference between the atmospheric pressure and the intake pressure when said first determining means determines that the gas does not accompany with the pressure change.

7. A device according to claim 5, wherein said first computing means computes the charging efficiency during the valve overlap period according to a ratio of the intake pressure and the atmospheric pressure when said first determining means determines that the gas accompanies with the pressure change.

8. A device according to claim 1, wherein said engine includes an injector for injecting a fuel to the cylinder, and wherein said calculating device further includes second computing means for computing an injection time of the fuel responsive to the amount of the air and control means for controlling the injector in response to the injection time.

9. A device according to claim 1, further comprising:

fifth detecting means for detecting a coolant temperature for the engine;

sixth detecting means for detecting a temperature of the air introduced to the air-intake passage;

second determining means for determining whether the rotational speed of the crank shaft reaches a predetermined value; and third computing means for computing an injection time in response to the coolant temperature, the temperature of the air, and the atmospheric pressure when said second determining means determines that the rotational speed of the crank shaft does not reach the predetermined value.

10. A device according to claim 9, wherein said first computing means computes the amount of the air when said second determining means determines that the rotational speed reaches the predetermined value.

11. A device according to claim 1, further comprising:

means for providing a target value with respect to the displacement of the operational timing;

means for determining whether the displacement of the operational timing converges the target value;

means for computing a deviation of the displacement of the operational timing from the target value when said determining means determines that the displacement of the operational timing converges the target value; and means for correcting the displacement of the operational timing based on the deviation.

12. A device according to claim 11, wherein said first computing means employs the corrected displacement of the operational timing when computing the amount of the air.

13. A device according to claim 12, further comprising:

memory means for storing data relative to the charging efficiency predetermined according to the rotational speed of the crank shaft, the displacement of the operational timing, and a load to the engine, and wherein said first computing means reads the data from the memory means when computing the charging efficiency.

14. A device according to claim 13, wherein said first computing means includes first determining means for determining in response to the rotational speed of the crank shaft whether the gas accompanies with a pressure change when the gas returns from the air-exhaust passage to the air-intake passage during the valve overlap period.

15. A device according to claim 14, wherein said first computing means computes the charging efficiency during the valve overlap period according to a difference between the atmospheric pressure and the intake pressure when said first determining means determines that the gas does not accompany with the pressure change.

16. A device according to claim 14, wherein said first computing means computes the charging efficiency during the valve overlap period according to a ratio of the intake pressure and the atmospheric pressure when said first determining means determines that the gas accompanies with the pressure change.

17. A device according to claim 11, further comprising:

means for controlling the variable valve timing mechanism based on the corrected displacement of the operational timing.

18. A device according to claim 1, further including means for introducing air, wherein the computed amount of air to be introduced to the cylinder controls the engine.

19. A device for determining an amount of an air introduced to a cylinder of an engine, said cylinder communicating with an air-intake passage and an air-exhaust passage, said air-intake passage being arranged to introduce the air to the cylinder, said air-exhaust passage being arranged to exhaust gas from the cylinder, both passages respectively having an intake valve and an exhaust valve therein, both valves being respectively driven by an intake valve drive mechanism and an exhaust valve drive mechanism in accordance with a rotation of a crank shaft to alternatively and selectively open and close, and to remain open during a valve overlap period to open the passages to the cylinder, said engine including a variable valve timing mechanism, and wherein said variable valve timing mechanism controls an operational timing of at least one of the valve drive mechanisms with respect to the crank shaft in accordance with a running condition of the engine to vary a timing of the valve driven by at least one of the valve drive mechanisms, said device comprising:

- first detecting means for detecting a rotational speed of the crank shaft;
- second detecting means for detecting an intake pressure in the air-intake passage;
- third detecting means for detecting the operational timing of at least one of the valve drive mechanisms;
- calculating means for calculating a displacement of the operational timing according to the detected rotational speed of the crank shaft and the detected operational timing; and
- fourth detecting means for detecting an atmospheric pressure;
- fifth detecting means for detecting a coolant temperature for the engine;
- sixth detecting means for detecting a temperature of the air introduced to the air-intake passage;
- first computing means for computing an amount of the air introduced to the cylinder in response to the rotational speed of the crank shaft, the intake pressure, the displacement of the operational timing, and the atmospheric pressure, said first computing means computing a charging efficiency of the air to be charged in the cylinder in response to the rotational speed of the crank shaft, the intake pressure, and the displacement of the operational timing when computing the amount of the air, wherein said charging efficiency is represented by a ratio of a weight of the air actually introduced to the cylinder to the weight of the air to be introduced to the cylinder under a standard air condition;
- an injector for injecting a fuel to the cylinder;
- second computing means for computing an injection time of the fuel responsive to the amount of the air;
- control means for controlling the injector in response to the injection time;
- speed determining means for determining whether the rotational speed of the crank shaft reaches a predetermined value;
- third computing means for computing the injection time in response to the coolant temperature, the temperature of the air, and the atmospheric pressure when said speed determining means determines that the rotational speed of the crank shaft does not reach the predetermined value; and wherein said first computing means computes the amount of the air when said second determining means determines that the rotational speed reaches the predetermined value.

20. A device according to claim 19, further comprising:
memory means for storing data relative to the charging efficiency predetermined according to the rotational speed of the crank shaft, the displacement of the operational timing, and a load to the engine, and wherein said first computing means reads the data from the memory means when computing the charging efficiency.

21. A device according to claim 19, wherein said first computing means includes pressure change determining means for determining in response to the rotational speed of the crank shaft whether the gas accompanies with a pressure change when the gas returns from the air-exhaust passage to the air-intake passage during the valve overlap period.

22. A device according to claim 21, wherein said first computing means computes the charging efficiency during the valve overlap period according to a difference between the atmospheric pressure and the intake pressure when said pressure change determining means determines that the gas does not accompany with the pressure change.

23. A device according to claim 21, wherein said first computing means computes the charging efficiency during the valve overlap period according to a ratio of the intake pressure and the atmospheric pressure when said pressure change determining means determines that the gas accompanies with the pressure change.

24. A device for determining an amount of an intake air introduced to a cylinder of an engine, said cylinder communicating with an air-intake passage and an air-exhaust passage, both passages respectively having an intake valve and an exhaust valve therein, both valves being respectively driven by valve drive mechanisms to selectively open and close, and to remain open during a valve overlap period to open the passages to the cylinder, said engine including variable valve timing means for controlling an operational timing of at least one of the valve drive mechanisms with respect to a crank shaft to vary a timing of at least one of the valves, said device comprising:

- first detecting means for sensing crank shaft rotation and detecting a rotational speed of the crank shaft;
- second detecting means for detecting an intake pressure in the air-intake passage;
- third detecting means for detecting the operational timing of at least one of the valve drive mechanisms;
- calculating means for calculating a displacement of the operational timing according to the detected rotational speed of the crank shaft and the detected operational timing; and
- computing means for computing an amount of the air introduced to the cylinder in response to the rotational speed of the crank shaft, the intake pressure, and the displacement of the operational timing.

* * * * *